(12) United States Patent
Kates

(10) Patent No.: US 7,634,975 B2
(45) Date of Patent: *Dec. 22, 2009

(54) TRAINING AND BEHAVIOR CONTROLLING SYSTEM FOR CANINES, FELINES, OR OTHER ANIMALS

(76) Inventor: Lawrence Kates, 1111 Bayside Dr., Corona Del Mar, CA (US) 92625

( * ) Notice: Subject to any disclaimer, the term of this patent is extended or adjusted under 35 U.S.C. 154(b) by 0 days.

This patent is subject to a terminal disclaimer.

(21) Appl. No.: 12/204,528

(22) Filed: Sep. 4, 2008

(65) Prior Publication Data

US 2008/0314335 A1    Dec. 25, 2008

Related U.S. Application Data

(60) Division of application No. 10/994,876, filed on Nov. 22, 2004, now Pat. No. 7,424,867, which is a continuation-in-part of application No. 10/893,549, filed on Jul. 15, 2004, now Pat. No. 7,409,924.

(51) Int. Cl.
*A01K 15/02* (2006.01)
(52) U.S. Cl. ........................... 119/712; 119/908
(58) Field of Classification Search ............... 119/712, 119/718, 719, 720, 721, 905, 908; 340/573.1, 340/573.2, 573.3
See application file for complete search history.

(56) References Cited

U.S. PATENT DOCUMENTS

| | | | |
|---|---|---|---|
| 1,773,141 | A | 8/1930 | Hodgson |
| 3,771,491 | A | 11/1973 | Hunter |
| 4,517,923 | A | 5/1985 | Palmer |
| 5,117,780 | A | 6/1992 | Wooten et al. |
| 5,195,455 | A | 3/1993 | van der Lely et al. |
| 5,299,529 | A | 4/1994 | Ramirez |
| 5,351,653 | A | 10/1994 | Marishchen et al. |
| 5,433,171 | A | 7/1995 | Ewell |
| 5,494,001 | A | 2/1996 | Leibowitz |
| 5,575,242 | A | 11/1996 | Davis et al. |
| 5,791,965 | A | 8/1998 | Kim |

(Continued)

FOREIGN PATENT DOCUMENTS

DE    29806228 U1    10/1998

(Continued)

OTHER PUBLICATIONS

Office Action dated Jan. 15, 2009 from Related U.S. Appl. No. 12/027,166.

(Continued)

*Primary Examiner*—T. Nguyen
(74) *Attorney, Agent, or Firm*—Knobbe, Martens, Olson & Bear, LLP

(57) ABSTRACT

A computer-aided training and management system that uses a computer or other processor in wireless communication with an instrumented dog collar and/or optionally, one or more dog interaction devices, such as, for example, video monitors, loudspeakers, video cameras, training toys (e.g., ball, bone, moving toy, etc.), an animatronics "trainer," a treat dispenser, a food dispensing and monitoring device, a water dispensing and monitoring device, tracking devices, a dog door, dog-monitoring doghouse, a dog-monitoring dog toilet, is described. In one embodiment, the instrumented dog collar is in two-way communication with a central computer system.

4 Claims, 22 Drawing Sheets

U.S. PATENT DOCUMENTS

| | | |
|---|---|---|
| 5,815,077 A | 9/1998 | Christiansen |
| 5,868,103 A | 2/1999 | Boyd |
| 5,872,516 A | 2/1999 | Bonge |
| 5,890,128 A | 3/1999 | Diaz et al. |
| 6,041,737 A | 3/2000 | Hennigan |
| 6,067,018 A | 5/2000 | Skelton et al. |
| 6,263,834 B1 | 7/2001 | Igual De Valles |
| 6,273,027 B1 | 8/2001 | Watson et al. |
| 6,367,417 B1 | 4/2002 | Gal et al. |
| 6,487,992 B1 | 12/2002 | Hollis |
| 6,550,426 B2 | 4/2003 | Tsengas |
| 6,571,742 B1 | 6/2003 | Tsengas |
| 6,598,563 B2 | 7/2003 | Kim et al. |
| 6,615,764 B2 | 9/2003 | Voogd et al. |
| 6,615,770 B2 | 9/2003 | Patterson et al. |
| 6,651,592 B2 | 11/2003 | Maddox et al. |
| 6,659,039 B1 | 12/2003 | Larsen |
| 6,691,639 B2 | 2/2004 | Singh et al. |
| 6,713,829 B1 | 3/2004 | Karpman |
| 6,720,879 B2 | 4/2004 | Edwards |
| 6,965,298 B2 | 11/2005 | Feinberg |
| 7,328,671 B2 | 2/2008 | Kates |
| 7,380,518 B2 | 6/2008 | Kates |
| 7,409,924 B2 | 8/2008 | Kates |
| 7,424,867 B2 | 9/2008 | Kates |
| 7,434,541 B2 | 10/2008 | Kates |
| 2001/0042522 A1 | 11/2001 | Barry et al. |
| 2002/0073931 A1 | 6/2002 | Boesch et al. |
| 2002/0077028 A1 | 6/2002 | Nishimoto |
| 2003/0027636 A1 | 2/2003 | Covannon et al. |
| 2003/0116099 A1 | 6/2003 | Kim et al. |
| 2003/0179140 A1 | 9/2003 | Patterson et al. |
| 2003/0226695 A1 | 12/2003 | Mault |
| 2005/0224003 A1 | 10/2005 | Yin et al. |
| 2005/0241589 A1 | 11/2005 | Forster |
| 2006/0011144 A1 | 1/2006 | Kates |
| 2006/0011145 A1 | 1/2006 | Kates |
| 2006/0011146 A1 | 1/2006 | Kates |
| 2006/0196445 A1 | 9/2006 | Kates |
| 2006/0196446 A1 | 9/2006 | Kates |
| 2006/0201433 A1 | 9/2006 | Kates |
| 2006/0201436 A1 | 9/2006 | Kates |
| 2006/0219187 A1 | 10/2006 | Krishnamurthy |
| 2008/0036594 A1 | 2/2008 | Kates |
| 2008/0216765 A1 | 9/2008 | Kates |
| 2008/0223300 A1 | 9/2008 | Kates |

FOREIGN PATENT DOCUMENTS

| | | |
|---|---|---|
| EP | 1312258 A1 | 5/2003 |
| WO | WO 02-060243 A1 | 8/2002 |

OTHER PUBLICATIONS

Office Action dated Nov. 17, 2008 from Related U.S. Appl. No. 11/417,941.

Campbell, William E., "How Dogs Think a Non-Verbal Link to Canine Communication," http://www.webtrail.com/petbehavior/dogthink.html, 1995, 6 pages.

Chowdhary, Sudhir, "How Well is Your Dog? Use this Chip," http://economictimes.indiatimes.com/articleshow/44763451.cms, Apr. 28, 2003, 1 page.

Sweat, Rebecca, "How Breeding Shapes Your Dog's Personality," http://petplace.netscape.com/articles/artshow.asp?artID=1190, Jul. 16, 2004 3 pages.

Vos Savant, Marilyn, "Why do Cats Ignore Their Reflections in Mirrors," http://www.beyondtacos.com/marilyn/mirrors.html, Jun. 23, 2004, 2 pages.

"S.C.A.N. Individual Microchip Technology F.A.Q.," http://www.networkusa.org/fingerprint/page5a/fp-chip-faq.html, Jan. 11, 2000, 20 pages.

"DECCA Navigator-Overview," http://webhome.idirect.com/~jproc/hyperbolic/decca_oview.html, Aug. 21, 2003, 9 pages.

Dog Training Equipment, Vinyl Works Stairway, http://www.vinylworks.com/dod/stairway.html, Jul. 9, 2004, 2 pages.

Dog Training Equipment, Vinyl Works Hurdle, http://www.vinylworks.com/uspca/hurdles.html, Jul. 9, 2004, 2 pages.

Dog Training Equipment, Vinyl Works Window, http://www.vinylworks.com/dod/window.html, Jul. 9, 2004, 2 pages.

Dog Training Equipment, Vinyl Works Window Hurdle, http://www.vinylworks.com/uspca/window_hurdles.html, Jul. 9, 2004, 2 pages.

Dog Training Equipment, Vinyl Works Catwalk, http://www.vinylworks.com/uspca/cat_walk.html, Jul. 9, 2004, 1 pages.

Dog Training Equipment, PVC Dog Jumps—AKC Obedience Training, http://www.dog-training.com/dogjumps.html, Jul. 9, 2004, 1 page.

Dog Training Equipment, Large Kong Training Dummy KCTD1, http://www.dog-training.com/watertoy.html, Jul. 9, 2004, 1 page.

Dog Tracking Equipment, Tracker Radio Tracking Systems, http://www.trackerradio.com/pets/htm, Jan. 27, 2005, 2 pages.

Dog Tracking Equipment, Maxima Receiver, http://www.tracker-radio.com/hunting.html#maxima, Jan. 27, 2005, 3 pages.

The Wonderful Shot: TOMY's digital camera for dogs, http://digitalcameras.engadget.com/entry/0647655998810633, Jan. 27, 2005, 3 pages.

GPS Pet Tracking devices, http://www.gps-practice-and-fun.com/gps-pet-tracking.html, Jan. 27, 2005, 3 pages.

Dog Tracking Collars, http://www.environmental-studies.de/products/GPS-GSM-dog-collar/dog-1.html, Jan. 27, 2005, 7 pages.

GPS Pet Tracking Device, http://www.cnet.com/4520-10602_1-5618893-1.html, Jan. 27, 2005, 2 pages.

Resner, Benjamin Ishak, "Rover@Home: Computer Mediated Remote Interaction Between Humans and Dogs", http://characters.media.mit.edu/publication.html, 108 pages, Sep. 2001.

Office Action dated Jan. 31, 2006 from Related U.S. Appl. No. 10/893,549.

Office Action dated Apr. 26, 2006 from Related U.S. Appl. No. 10/893,549.

Office Action dated Jul. 21, 2006 from Related U.S. Appl. No. 10/893,549.

Office Action dated Feb. 1, 2007 from Related U.S. Appl. No. 10/893,549.

Office Action dated Sep. 20, 2007 from Related U.S. Appl. No. 10/893,549.

Advisory Action dated Nov. 12, 2007 from Related U.S. Appl. No. 10/893,549.

Notice of Allowance dated Mar. 31, 2008 from Related U.S. Appl. No. 10/893,549.

Office Action dated Jul. 5, 2006 from Related U.S. Appl. No. 10/994,876.

Office Action dated Nov. 8, 2006 from Related U.S. Appl. No. 10/994,876.

Office Action dated Jul. 25, 2007 from Related U.S. Appl. No. 10/994,876.

Notice of Allowance dated May 12, 2008 from Related U.S. Appl. No. 10/994,876.

Examiner's Amendment dated Sep. 11, 2008 from Related U.S. Appl. No. 10/994,876.

Office Action dated Sep. 29, 2006 from Related U.S. Appl. No. 11/029,567.

Office Action dated May 7, 2007 from Related U.S. Appl. No. 11/029,567.

Office Action dated Sep. 25, 2007 from Related U.S. Appl. No. 11/029,567.

Office Action dated Dec. 12, 2007 from Related U.S. Appl. No. 11/029,567.

Notice of Allowance dated Jul. 31, 2008 from Related U.S. Appl. No. 11/029,567.

Office Action dated Sep. 26, 2006 from Related U.S. Appl. No. 11/417,443.

Office Action dated Mar. 23, 2007 from Related U.S. Appl. No. 11/417,443.

Office Action dated Nov. 5, 2007 from Related U.S. Appl. No. 11/417,443.

Office Action dated Mar. 19, 2008 from Related U.S. Appl. No. 11/417,443.
Office Action dated Oct. 29, 2008 from Related U.S. Appl. No. 11/836,695.
Office Action dated Jan. 19, 2007 from Related U.S. Appl. No. 11/417,571.
Office Action dated May 2, 2007 from Related U.S. Appl. No. 11/417,571.
Office Action dated Aug. 23, 2007 from Related U.S. Appl. No. 11/417,571.
Office Action dated Sep. 20, 2007 from Related U.S. Appl. No. 11/417,571.
Notice of Allowance dated Nov. 21, 2007 from Related U.S. Appl. No. 11/417,571.
Office Action dated Oct. 10, 2006 from Related U.S. Appl. No. 11/417,394.
Office Action dated Nov. 21, 2006 from Related U.S. Appl. No. 11/417,394.
Office Action dated Apr. 12, 2007 from Related U.S. Appl. No. 11/417,394.
Office Action dated Aug. 30, 2007 from Related U.S. Appl. No. 11/417,394.
Notice of Allowance dated Apr. 8, 2008 from Related U.S. Appl. No. 11/417,394.
Office Action dated Sep. 22, 2008 from Related U.S. Appl. No. 12/131,767.
Office Action dated Jan. 26, 2007 from Related U.S. Appl. No. 11/417,941.
Office Action dated May 17, 2007 from Related U.S. Appl. No. 11/417,941.
Office Action dated Sep. 20, 2007 from Related U.S. Appl. No. 11/417,941.
Office Action dated May 13, 2008 from Related U.S. Appl. No. 11/417,941.
Office Action dated Nov. 4, 2008 from Related U.S. Appl. No. 11/417,443.

DOG COLLAR 1 (TRAINING)

FIG. 3  DOG COLLAR II (TRAINING AND MANAGEMENT)

DOG TOY

TREAT DISPENSER

WATER DISPENSER

DOG TOILET

DOG COLLAR II
(TRAINING AND MANAGEMENT)

TRAINING AND BEHAVIOR CONTROLLING SYSTEM FOR CANINES, FELINES, OR OTHER ANIMALS

REFERENCE TO RELATED APPLICATIONS

This application is a divisional of application Ser. No. 10/994,876, filed Nov. 22, 2004, titled "CAMERA SYSTEM FOR CANINES, FELINES, OR OTHER ANIMALS, now U.S. Pat. No. 7,424,867, which is a continuation-in-part of application Ser. No. 10/893,549, filed Jul. 15, 2004, titled "TRAINING, MANAGEMENT, AND/OR ENTERTAINMENT SYSTEM FOR CANINES, FELINES, OR OTHER ANIMALS," now U.S. Pat. No. 7,409,924, the entire contents of which is hereby incorporated by reference.

BACKGROUND OF THE INVENTION

1. Field of the Invention

The present invention relates to systems for computer-aided training and management of dogs, cats, and other animals.

2. Description of the Related Art

Electronic dog training collars that provide warning sounds, followed by some form of punishment for the purpose of training dogs not to engage in nuisance barking are well known. This type of system is activated when a dog's barking sound is picked up from the dog's throat area by a sound-sensing device located on a dog collar. Electronic dog training collars that provide warning sounds, followed by some form of punishment for the purpose of training dogs to stay within an established area are also well known. This type of system is activated when a radio receiver in the collar picks up a signal transmitted through a buried wire antenna. This type of training device does not provide a method for allowing the dog to return to the established area in the event it escapes, without receiving correction. Another type of electronic dog training collar provides warning sounds, then some form of punishment when behavioral problems are visually detected by the dog trainer who activates a radio transmitter contained within a handheld enclosure. This signal, in turn, is received by a dog collar and the correction sequence is initiated. Some training collars of this type have a tilt switch which senses whether a dog is moving or standing still (pointing).

These and other prior art systems are limited in capability and are primarily designed to correct specific unwanted behaviors. Such systems are geared towards giving the dog a negative stimulus (punishment) when the unwanted behavior occurs. The prior art systems, aside from keeping the dog in the yard, are not concerned with protecting the happiness, health and well-being of the dog (or other animal). Moreover, it is well known that punishment training is a poor method of training and often leads to behavioral problems. Dogs have an innate desire to please, and thus, the best trainers know to base the training on reward and encouragement, and to use punishment sparingly.

SUMMARY

These and other problems are solved by a computer-aided training and management system that uses a computer or other processor in wireless communication with an instrumented dog collar and/or optionally, one or more dog interaction devices, such as, for example, video monitors, loudspeakers, video cameras, training toys (e.g., ball, bone, moving toy, etc.), an animatronics "trainer," a treat dispenser, a food dispensing and monitoring device, a water dispensing and monitoring device, tracking devices, a dog door, dog-monitoring doghouse, a dog-monitoring dog toilet, etc. In one embodiment, an instrumented dog collar is in two-way communication with a central computer system.

In one embodiment, a video device (or devices) and/or loudspeakers are used to provide training commands. The dog collar and/or one or more training toys, video monitors, etc. are fitted with wireless instrumentation to provide feedback regarding the dog's response to the training commands. In one embodiment, a computer-controlled treat dispenser is used to reward the dog. The training system can be used to entertain the dog, to train the dog to perform specific tasks, to train behaviors, and/or to increase the dog's vocabulary.

In one embodiment, a food dispensing and monitoring device and/or a water dispensing and monitoring device are provided to feed the dog and to monitor the dog's health and well-being by measuring the dogs intake of food and water. In one embodiment, tracking devices such, as for example, Infrared Red (IR) location, acoustic location, Radio Frequency (RF) location, GPS location, and/or inertial motion tracking are used to determine the dog's location. In one embodiment, the management system controls a "dog door" to allow the dog ingress and egress into a house or other structure.

In one embodiment, a wireless dog collar communicates with a Radio Frequency Identification (RFID) tag implanted in the dog and relays information from the RFID tag to the computer monitoring system. In one embodiment the RFID tag includes a temperature sensor to allow the monitoring system to monitor the dog's temperature. In one embodiment the RFID tag includes one or more biometric sensors to measure the dog's health and well-being, such as for example, temperature, blood pressure, pulse, respiration, etc.

In one embodiment, the animal management system includes a computer system provided to a first wireless communication transceiver and an animal collar provided to a second wireless communication transceiver. The animal collar has an identification code and is configured to communicate with the computer system using two-way handshaking communication such that the computer system can send commands to the animal collar and receive acknowledgement of the commands from the animal collar. The animal collar can send data to the computer system and receive acknowledgement from the computer system according to the identification code. The computer system is configured to send commands to the animal collar and to receive data from the animal collar related to one or more actions of an animal wearing the animal collar. The computer system is configured to keep records of at least a portion of the animal's actions.

In one embodiment, the animal collar includes at least one of, an acoustic input device, an acoustic output device, a vibrator device, an odor output device an infrared receiver, an infrared transmitter, an RFID tag reader, a GPS receiver, an inertial motion unit (e.g., accelerometers or gyroscopes).

In one embodiment, the animal management system includes at least one of, an RF location system, a computer-controlled treat dispenser, a computer-controlled water dispenser, a computer-controlled food dispenser, computer-controlled animal toilet, a computer-controlled animal house, a video monitor. In one embodiment, the animal management system includes at least one animal toy configured to wirelessly communicate with the computer system. In one embodiment, the wireless toy includes at least one of, a light, an acoustic input device, an acoustic output device, a touch (or usage) sensor, a motion sensor, a location tracking system.

In one embodiment, the animal management system includes one or more location system units disposed about an area, such as, for example, a house, barn, yard, ranch, etc. In one embodiment, the location system units use infrared radiation for location and tracking of the animal collar. In one embodiment, the location system units use acoustic waves for location and tracking of the animal collar. In one embodiment, the location system units use electromagnetic waves for location and tracking of the animal collar. In one embodiment, the location system units are also configured to operate as motion detectors for a home security system.

DETAILED DESCRIPTION

Figure 1:
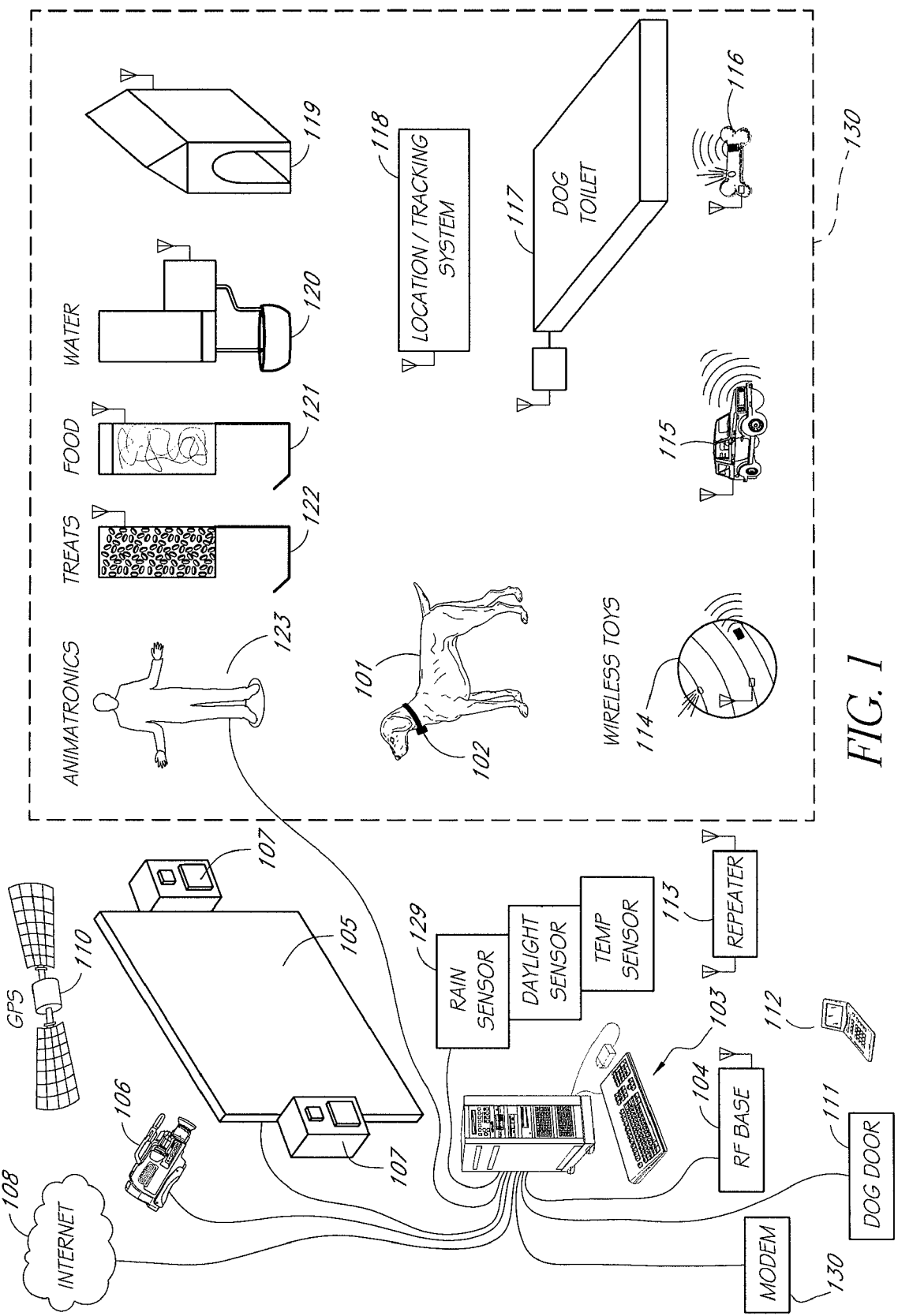
FIG. 1 shows various elements of a dog training and management system.

FIG. 1 shows various elements of a dog training and management system 100 for managing a pet or animal such as a dog 101. For purposes of explanation, and not by way of limitation, the system 100 is described herein as a training system and a dog management system. One of ordinary skill in the art will recognize that various aspects of the system 100 can also be used for cats, other pets, farm animals, livestock, zoo animals, etc. The system 100 includes a computer system 103 to control the system 100 and, to collect data, and to provide data for the owner/trainer. The system typically includes a wireless animal system 102 and a wireless base unit 104. The wireless animal system 102 is attached to the dog 101 by a collar, harness, implantation, etc. The base unit 104 is provided to the computer 103 and allows the computer 103 to communicate with the animal system 102. In one embodiment, the animal system 102 communicates with a Radio Frequency ID (RFID) tag embedded in the dog 101. The RFID tag provides an identification code to identify the dog 101. The animal system 102 reads the RFID tag and relays the information from the RFID tag to the computer 103. In one embodiment, the RFID tag includes one or more biometric sensors to allow the computer 103 to monitor the health and condition of the dog 101. In one embodiment the RFID tag includes a temperature sensor to allow the monitoring system to monitor the dog's temperature. In one embodiment the RFID tag includes one or more biometric sensors to measure the dog's health and well-being, such as for example, temperature, blood pressure, pulse, respiration, blood oxygenation, etc.

The system 100 can also include one or more of the following optional devices: one or more video monitors 105, one or more loudspeakers 107, one or more video cameras 106, one or more RF training toys (e.g., a ball 114, a bone 116, a moving toy 115, etc.), an animatronics "trainer" 123, and a treat dispenser 122. The system 100 can further include one or more of the following optional devices: a remote control/display 112 for displaying the dog's location, a food dispensing and monitoring device 121, a water dispensing and monitoring device 120, one or more systems for locating the dog, one or more RF repeaters 113, one or more dog-door controllers 111, a dog-monitoring doghouse 119, a dog-monitoring dog toilet 117, and ambient condition sensors (e.g., rain, wind, temperature, daylight, etc.) 129. In one embodiment, the ambient condition sensors are wireless sensors that communicate wirelessly with the computer system 103.

In one embodiment, the system 100 can be used as a computerized training system for training the dog 101. During training, the system 100 provides training commands or instructions to the dog 101. Audio commands can be provided through the loudspeakers 107, through a loudspeaker in the animal system 102, and/or through audio devices (e.g., loudspeakers, buzzers, etc.) in the dog toys 114-116. Visual commands can be provided by the monitor 105, by an animatronics trainer 123, and/or by visual display devices (e.g., lights in the toys 114-116, lights on the toilet 117, dog house 119, dispensers 121-122) etc. The dog tracking system described below can be used to provide corrective commands when the dog 101 is not performing correctly and/or to provide encouragement then the dog 101 is performing correctly.

In one embodiment, a modem 130 is provided for making connections with the telephone system, to allow the system 100 to communicate with an owner/trainer through cellular telephone, text messaging, pager, etc. A network connection 108 (e.g., an Internet connection, local area network connection, wide area network connection, etc.) is provided to allow the owner/trainer to communicate with the system 100 and to allow the system 100 to receive updated software, updated training regimens, etc.

In one embodiment, the animal system 102 provides positive reinforcement (e.g., clicker sounds, "good dog" sounds, pleasing sounds, pleasing smells, treats, etc.) and/or negative reinforcement commands (e.g., unpleasant sounds, electric shock, unpleasant vibration, unpleasant smells, etc.)

The dog toys provide touch and/or motion feedback to the training system 100. The training system 100 delivers a treat to the dog using the treat dispenser 122 when it receives confirmation that the dog has properly performed the command. In one embodiment, an Inertial Motion Unit (IMU) in the dog animal system 102 and/or the video cameras 106 are be used to determine when the dog performs a desired action (e.g., sit, roll over, lie down, retrieve a toy, etc.). A location system described below can be used to keep the dog in a desired area and out of "off limits" areas. In one embodiment, the location system uses multiple inputs to determine the dog's location.

In one embodiment, the dog toys 114-116 are adapted to specialized training such as, for example, bomb-sniffing, drug-sniffing, etc.

In one embodiment, the animatronics trainer 123 is configured to smell like a human (e.g., by placing clothes warn by the owner/trainer on the animatronics trainer). In one embodiment, the animatronics trainer 123 is configured to speak to the dog. In one embodiment, the animatronics trainer 123 is configured to provide treats to the dog. In one embodiment, the animatronics trainer 123 is mobile and is configured to walk the dog. In one embodiment, the animatronics trainer 123 is configured to be used to teach the dog to heel.

In one embodiment, the system 100 uses the sensors 129 to detect fire or smoke. In one embodiment, the system 100 receives alarm data from a home alarm system. In one embodiment, the microphone 204 is used to detect a fire alarm. When the system 100 detects a fire or smoke alarm, the system 100 can open the dog door 111, instruct the dog to leave, close the dog door 111 after the dog has left, and notify the owner/trainer. The owner/trainer can be notified by using the loudspeakers 107, by telephone, pager, and/or text messaging using the modem 130 to connect with the telephone system, and/or by using the network connection 108 (e.g., email instant messaging, etc.). The modem 130 is configured to place a telephone call and then communicate with the owner using data (e.g., in the case of text messaging) and/or synthesized voice. The modem 130 can also be used by the owner/trainer 130 to contact the computer system 103 and control the system 100 using voice recognition commands and/or data.

In one embodiment, the system 100 uses the video cameras 106 to record videos of the dog's training. These videos can be played back for the owner/trainer to help the owner/trainer understand how the training is progressing and to spot problems.

For example, the system 100 can be used, for example, to train the dog 101 to understand one or more of the following commands/actions:

A. General Commands
Sit—Stay
Come Here (or Come, or Here)
Down—Stay
Heel
Stand—Stay
Stand
Don't Growl
Stand Here/Stand By Me
Lie Down
Up
Down
Shake Hands
Roll Over
No Paw
Slow-Time (walking command)
Fast-Time (walking command)
Take-Time (walking command—Slow Down)
Catch/Fetch
Speak/Bark
Retrieve
Eat Food
Don't Do That
No
Go Ahead
O.K.
Track
Go Out
Let Go
Look Back
Get Out
Kennel/Crate ('Go to the kennel, etc.')
Bad Dog
Come Back
Get Ball
Nice Dog
Good Dog/Nice Dog
Quiet
Go To Sleep
Walk/Go For A Walk
Run
Let's Play
Put That Down
Don't Shake Hands
Stop Barking
Don't Go Out/Don't Go Outside/Don't Go Out Door
T.V. (e.g., stop the dog from barking at the TV or the doorbell)
Go To The Corner
Leave It/Drop It
B. Military/Police-Type Commands
Search
Bite
Hold
Jump
Track
Blind Search
Guard
Go Ahead
Let Go
Stop/Halt
Article Search (A command for the dog to search for contraband or other illegal items at an airport or another facility)
Go Inside
Go Outside
Don't Do That
Stand
Speak/Bark
Attack
C. Situations in which control of the dog's behavior must be altered:
Remain In Yard/Stay In The Yard (or similar area)
Housebreaking
Inappropriate Dominant Behavior
Staying Off The Furniture
Staying Off Guests/Don't Jump On Guests/Don't Bother Guests
Eliminate Chewing Furniture
Stop Inappropriate Barking
Stay Out Of The Trash Cans
Get The Newspaper
Get Bedroom Slippers
Don't Defecate/Urinate In House
Eliminate Chewing Of Household Items
Do Not Exhibit Aggressive Behavior Towards Visitors
Don't Chase Cars or Other Moving Objects
Eliminate Nipping/Snapping Behaviors Eliminate Or Prevent Excessive Fear Reactions or 'Paranoia' in the dog.

Eliminate Negative Behaviors Such As Excessive, Unfounded Whining, Whimpering, or Vocalizing Other Similar Sounds In Inappropriate Situations Eliminate Uncontrolled (and sometimes destructive) Overenergetic Or Separation Anxiety-Related Behaviors The above lists are not exhaustive, but are intended to illustrate types of training that the system 100 can provide. The dog's response to commands is monitored by the system 100 by using data from the animal system 102, from the toys and other devices 114-123, and/or by video processing from one or more video cameras 106. In addition, the dog's response to commands can be determined by the owner/trainer in real time and by watching video obtained by the one or more video cameras 106. The system 100 can be used to train the dog to obey new commands and/or to reinforce commands the dog already understands. In one embodiment, a trainer works with the dog 101 and the system 100 to get the dog accustomed to the system 100 and to give the dog a starting vocabulary of basic commands (e.g. sit, stop, get the lighted toy, etc.) and then the system 100 can be used to reinforce the basic commands and to teach the dog new commands.

Figure 2:
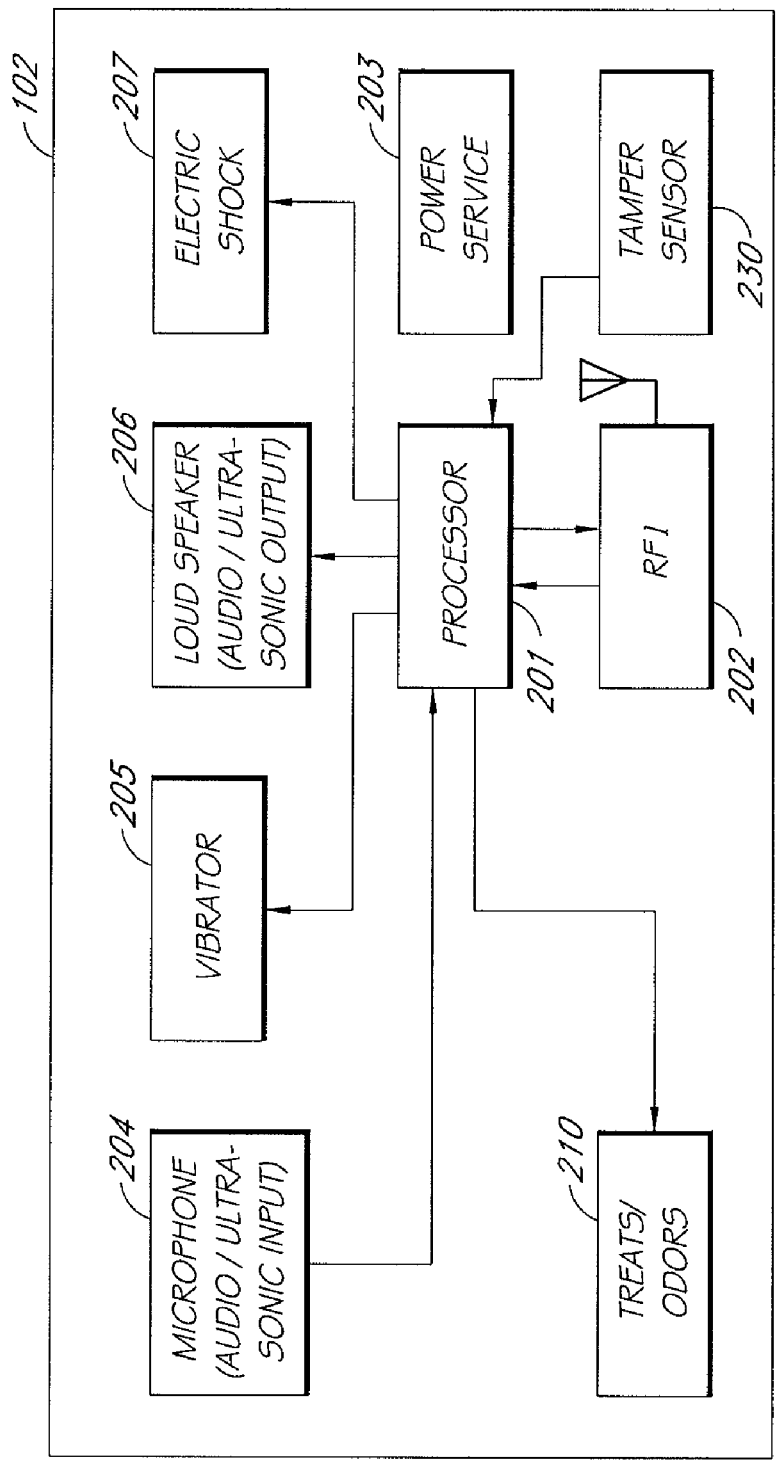
FIG. 2 is a block diagram of the dog collar.

FIG. 2 is a block diagram of an animal module the animal system 102. In the animal system 102, a sound sensing device (e.g., a microphone) 204, a vibration device 205, a sound producing device (e.g., a loudspeaker) 206, an electric shock device 207, and a first RF transceiver 202 are provided to a processor 201. The sound sensing device is configured to sense sound waves (sonic and/or ultrasonic) such as, for example, a microphone, a transducer, etc. For convenience, and without limitation, the sound sensing device is referred to herein as a microphone with the understanding that other acoustic transducers can be used as well. For convenience, and without limitation, the sound producing device is referred to herein as a loudspeaker with the understanding that the sound producing device is configured to produce sound waves (sonic and/or ultrasonic) such as, for example, a loudspeaker, a transducer, a buzzer, a clicker, etc. A power source 203 provides power for powering the microphone 204, the vibration device 205, the loudspeaker 206 and the electric shock device 207, the first RF transceiver 202 and the processor 201. In one embodiment, each of the microphone 204, the vibration device 205, the loudspeaker 206 and the electric shock device 207 are optional and can be omitted. The animal system 102 can also include an odor/treat dispensing device 210 for providing pleasant smells, treats, and/or unpleasant smells so the dog 101. The animal system 102 can also include a light (not shown) for providing visual indications to the dog 101, to the trainer, or to the video cameras 106. In one embodiment, a tamper sensor 230 is also provided.

The microphone 204 is used to pick up sound waves, such as, for example, sounds produced by the dog 101, sounds produced by other dogs, and/or acoustic waves produced by an acoustic location device (sonic or ultrasonic), etc. The processor 201 processes the sounds picked up by the microphone and, if needed, sends processed data to the computer system 103 for further processing. The loudspeaker 206 is used to produce pleasant and/or unpleasant sounds for the dog 101 and to provide commands to the dog 101. The microphone 204 and/or loudspeaker 206 can also be used in connection with an acoustic location system to locate the dog using acoustic waves. In an acoustic location system, the microphone 204 and/or loudspeaker 206 communicate acoustically with acoustic sources or sensors placed about the house or yard to locate the dog 101.

The vibrator is used to produce pleasant and/or unpleasant vibrations to the dog 101. The electric shock device 207 is used to provide corrective shocks to the dog 101. In one embodiment, the shock device 207 can provide a range of shocks from relatively mild to relatively harsh. In one embodiment, the computer system 103 instructs the processor 201 to control the electric shock device 207 to deliver a desired shock intensity.

The optional tamper sensor 230 senses when the collar has been tampered with (e.g., removed from the dog). In one embodiment, the optional dispenser 210 dispenses odors such as pleasant and/or pleasant odors to the dog 101. In one embodiment, the optional dispenser 210 dispenses treats for the dog 101.

The first RF transceiver 202 communicates with the base unit 104 either directly or through the repeaters 113. In one embodiment, the RF transceiver 202 provides two-way communications such that the animal system 102 can send information to the computer system 103 and receive commands from the computer system 103. In one embodiment, the computer system 103 and the first RF transceiver 202 communicate using a handshake protocol, to verify that data is received.

Figure 3:
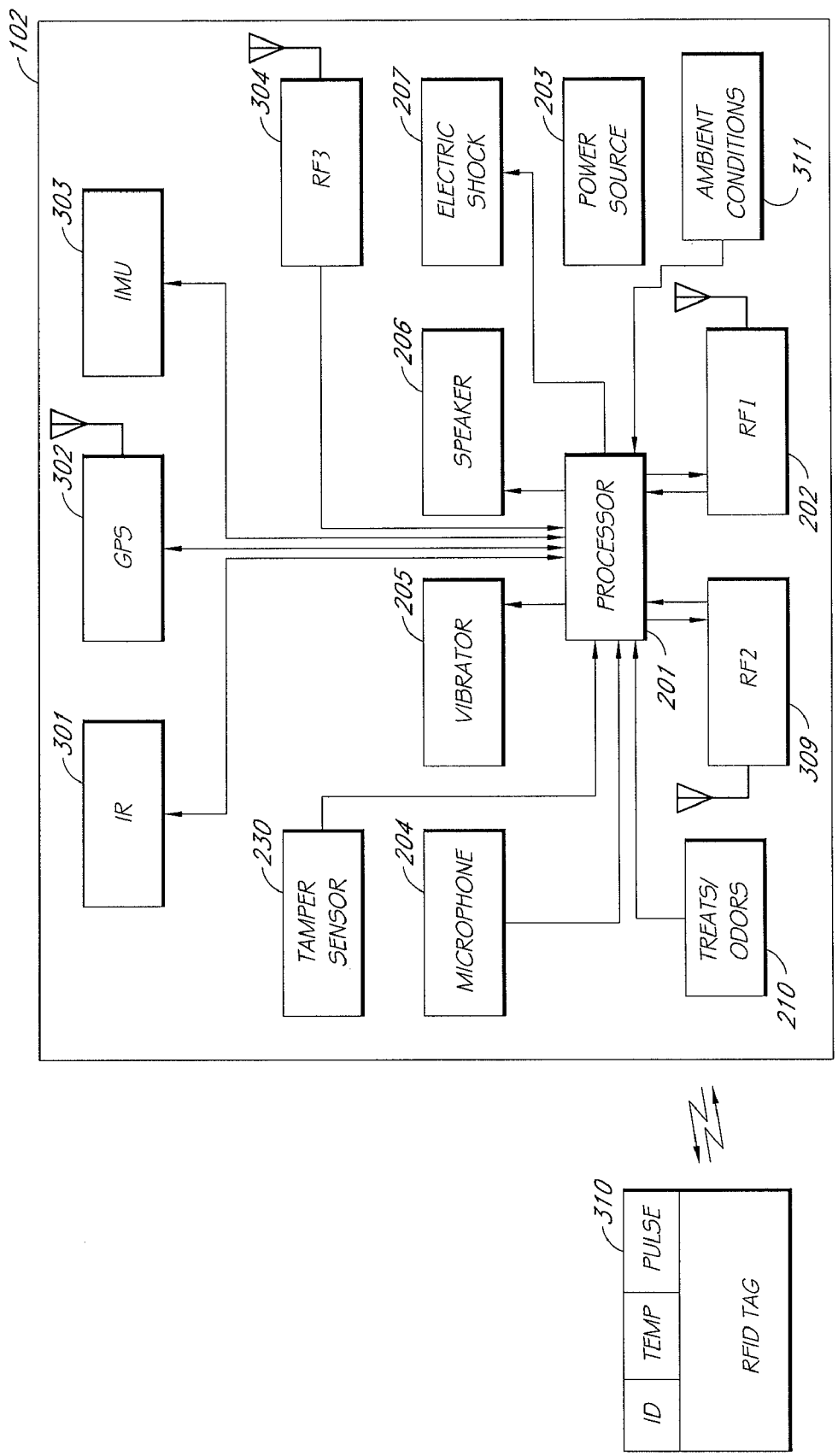
FIG. 3 is a block diagram of the dog collar from FIG. 2 with the addition of location finding systems and a second RF transceiver for communicating with an RFID tag.

FIG. 3 is a block diagram of the dog animal system 102 from FIG. 2 with the addition of location finding systems and a second RF transceiver 309 for communicating with an RFID tag 310 imbedded in the dog 101. In FIG. 3, the animal system 102 includes one or more location and tracking systems, such as, for example, an IR system 301, a GPS location system 302, an IMU 303 and/or a third RF transceiver 304. The tracking systems can be used alone or in combination to ascertain the location of the dog. The IR system 301, the GPS location system 302, the IMU 303, and the third RF transceiver 304 are provided to the processor 201 and powered by the power source 203. The processor 201 controls operation of the IR system 301, the GPS location system 302, the IMU 303, and the third RF transceiver and controls when the power source delivers power to the IR system 301, the GPS location system 302 and the IMU 303. The first second and third RF transceivers are separated in FIG. 3 for purposes of description, and not by way of limitation. In one embodiment, the first RF transceiver 202, and/or the second RF transceiver 309 and/or the third RF transceiver 304 are combined into one or more transceivers. In one embodiment, the first RF transceiver 202, and/or the second RF transceiver 309 and/or the third RF transceiver 304 operate at different frequencies.

The second RF transceiver 309 communicates with the RFID tag 310 to obtain information (e.g., identification, temperature, pulse rate, biometric information, etc.) from the RFID tag 310.

In one embodiment, the third RF transceiver 304 is a receive-only device that receives radio location signals from one or more radio location transmitters as part of a radio location system. In an alternative embodiment, the third RF transceiver 304 is a transmit-only device that transmits radio location signals to one or more radio location receivers as part of a radio location system. In an alternative embodiment, the third RF transceiver 304 transmits radio location signals to and receives radio location signals from one or more radio location transceivers as part of a radio location system. Techniques for radio location systems such as, for example, GPS, DECCA, LORAN, etc. are known in the art. Data from the radio location system is provided to the computer system 103 to allow the computer system 103 to determine the location of the animal system 102. In one embodiment, radio location is provided by measuring a strength of a signal transmitted by the animal system 102 and received by one or more repeaters 113 to estimate distance between the repeaters and the animal system 102. In one embodiment, radio location is provided by measuring a strength of signals transmitted by one or more repeaters 113 and received by the animal system 102 to estimate distance between the repeaters and the animal system 102. In one embodiment, a time delay corresponding to radio frequency propagation between the repeaters 113 and the animal system 102 is used to estimate the location of the animal system 102.

The various location systems have benefits and drawbacks. In one embodiment, the system 100 uses a combination of one or more of a GPS system, an IMU, a radio-location system, an IR system, and an acoustic system, to locate the dog 101. One or more of these systems are used synergistically to locate the dog 101 and to reduce the power consumed in the animal system 102 by the location process.

The IMU 303 uses one or more accelerometers and/or gyroscopes to sense motion of the collar. The motion can be integrated to determine location. The IMU 303 provides relatively low power requirements and relatively high short-term accuracy. The IMU provides relatively lower long-term accuracy. An Inertial Motion Units (IMU) unit will work indoors or out, and typically consumes less power than other location systems. However, IMU systems are prone to drift over time and tend to loose accuracy if not recalibrated at regular intervals. In one embodiment, is recalibrated from time to time by using data from one or more of the GPS, acoustic, IR, and/or RF location systems. In one embodiment the IMU 303 is used to reduce power requirements for the GPS, IR, and/or RF location systems. In one embodiment, the GPS, IR, and/or RF location systems are placed in a low-power or standby mode when the IMU 303 senses that the animal system 102 is motionless or relatively motionless. If the IMU 303 senses that the animal system 102 is relatively motionless (e.g., motionless or moving at a relatively low velocity) then the dog is either not moving or is moving slowly enough that tracking is not immediately needed. In one embodiment, the IMU 303 is a 3-axis system and thus, motion of the animal system 102 in any direction is sensed as motion and can be used to activate one or more of the other sensing systems. Thus, for example, if the dog has been lying down and then stands up, the "up" motion will be sensed by the IMU 303 and the collar will activate one or more tracking systems.

In one embodiment, the system 100 assumes that the dog 101 will not move at a relatively constant and relatively low velocity for any significant length of time. Thus, in one embodiment, the IMU self-calibrates to a constant offset error (e.g. a constant slope in the X, Y or Z direction) and a deviation from that constant X, Y offset error (e.g., a change in slope) is recognized as a movement by the dog 101.

In one embodiment, the IMU 303 is at least a 2-axis IMU that senses motion in at least two directions. In one embodiment, the IMU 303 is at least a 3-axis IMU that senses motion in at least three directions. In one embodiment, the IMU 303 provides data to determine that the dog 101 has rolled over, jumped, etc. In one embodiment, the IMU provides data used to determine the gait of the dog 101, such as, for example, running, walking, going up stairs, going down stairs, trotting, limping, etc. In one embodiment, the IMU provides data used to determine head motions of the dog 101, such as, for example, barking, retching, etc. In one embodiment, data from the IMU is used in connection with signal processing of audio signals from a microphone in the animal system 102 to determine if the dog 101 is barking, retching, whimpering, drinking, choking, whining, etc.

For training, the IMU can be used alone or in combination with other tracking devices to obtain feedback on the motion of the dog 101. Thus, for example, if the dog 101 is commanded to pick up the ball 114, and the IMU senses that the dog 101 is moving towards the ball 114, then the system 100 can provide positive feedback to the dog.

The IMU 303 can measure both dynamic acceleration as well as static acceleration forces, including acceleration due to gravity, so the IMU 303 can be used to measure tilt as well as horizontal and vertical motion. When the IMU 303 is oriented so both the X and Y axes are parallel to the earth's surface it can be used as a two axis tilt sensor with a roll and pitch axis. Ninety degrees of roll would indicate that the dog 101 is lying on its side. In addition, when the IMU 303 indicates no movement at all, regardless of the orientation of the dog 101, the dog is asleep or inactive and the system is powered down, as described above. Thus, the IMU 303 can detect when the dog is not standing.

With regard to digging movements of the dog 101, the IMU 303 can detect forward motion (dynamic motion) or lack of forward motion of the dog, in addition to tilt. If the IMU 303 detects that the dog's forward motion has stopped and a motion perpendicular to the main axis of the dog continues, the dog is digging. If this criteria is used in conjunction with IMU 303 recognition of a downward tilt toward the front of the dog's body, the digging motion is likely. Digging detection can be disabled automatically when the dog is laying down, rolling over, etc. With regard to jumping, the IMU 303 can be used to detect a movement essentially straight up, or up and slightly rearward, the dog is jumping up.

The microphone 204 is used to listen to the dog for barking, whimpering, cries of distress or pain, retching, etc. The IMU 303 (if provided) can be used in connection with the microphone 204 to help detect barking, retching, etc. and other sounds where a head movement is associated with the sound. In one embodiment, to reduce power consumption, the animal system 102 performs a preliminary acoustic analysis and forwards suspicious results to the computer system 103 for more detailed processing. The microphone 204 can also be used with an optional ultrasonic (or acoustic) location system.

The animal system 102 sends low-battery warnings to the computer system 103 to alert the owner/trainer that the animal system 102 needs fresh batteries.

The loudspeaker 206 is used to provide training commands, such as, for example, spoken commands, positive reinforcement sounds (e.g. clicker sounds, "good dog" phrases, etc.), negative reinforcement sounds (e.g., unpleasant sounds), etc. The vibrator 205 can be used for varying levels of relatively mild negative reinforcement during training. The electric shock generator 207 can be used for mild to strong negative reinforcement.

The Global Positioning System (GPS) is accurate but often does not work well indoors, and sometimes does not have enough vertical accuracy to distinguish between floors of a building. GPS receivers also require a certain amount of signal processing and such processing consumes power. In a limited-power device such as the dog animal system 102, the power consumed by a GPS system can reduce battery life. However, GPS has the advantage of being able to operate over a large area and is thus, particularly useful when locating a dog that has escaped a confined area or is out of the range of other locating systems.

In one embodiment, the GPS system 302 operates on a standby mode and activates at regular intervals or when instructed to activate. The GPS system can be instructed by the computer 103 or the collar to activate. When activated, the GPS system obtains a position fix on the dog 101 (if GPS satellite signals are available) and updates the IMU. In one embodiment, a GPS system is also provided to the computer system 103. The computer system uses data from its GPS system to send location and/or timing data to the GPS system 302 in the animal system 102 allowing the GPS system 302 to warm start faster, obtain a fix more quickly, and therefore, use less power.

In one embodiment, location system units 118 are placed about a house or kennel to locate movement and location of the dog 101. In one embodiment, location system units 118 send infrared light, acoustic waves, and/or electromagnetic waves to one or more sensors on the animal system 102 in order to conserve power in the animal system 102. In one embodiment, the animal system 102 sends infrared light, acoustic waves, and/or electromagnetic waves to the location system units 118 in order to conserve power in the units 118.

For example, location system units 118 placed near doorways or in hallways (see e.g., FIG. 14) can be used to determine when the dog 101 moves from one room to another. Even if the dog cannot be exactly located within the room (e.g., due to blind spots), a location system unit 118 placed to sense the movement of the dog through the doorway allows the system 100 to know which room the dog is in by watching the dog 101 move from room to room.

In one embodiment, each location transmitter (whether in the animal system 102 or the location system units 118) sends a coded pattern of pulses to allow the transmitter to be identified. In one embodiment, in order to conserve power, the location receiver (whether in the animal system 102 or the location system units 118) notifies the computer system 103 whenever the pattern of received pulses changes. Thus, for example, when the location receiver enters the range of a first location transmitter that transmits a first code, the location receiver sends a "location sensor message" to the computer system 103. In one embodiment, the location receiver does not send further location sensor messages so long as the location receiver continues to receive the pattern of pulses from the same location transmitter. In an alternate embodiment, the location receiver sends location sensor messages to the computer system 103 on a periodic basis so long as the location receiver continues to receive the pattern of pulses from the same transmitter. The location receiver sends a "location sensor lost" message when the pattern of pulses stops.

Motion detectors inside and/or outside a house are commonly provided in connection with home security systems. In one embodiment, the location system units 118 are configured as motion detectors, and the IR system 301 (e.g., transmitter and/or receiver) on the animal system 102 communicates with such IR motion detectors to avoid false alarms that would otherwise occur when the motion detector detects the movement of the dog. In one embodiment, the collar transmits an IR signal that the motion detector recognizes as coming from the animal system 102 and thus, the motion detector knows that the motion it is sensing is due to the dog and not an intruder. In one embodiment, when the animal system 102 detects an IR transmission from a motion detector, the collar transmits a response IR signal that the motion detector recognizes. In one embodiment, the IR tracking system used by the system 100 is also used as part of a home security system to track both the movement of the dog and other movements in the house that are not due to the dog. Acoustic motion detectors and/or microwave motion detectors can be used with the animal system 102 similarly to the IR motion detectors.

Unlike VHF radio-based systems (e.g., GPS or VHF radio-location systems, etc.), IR, acoustic, and/or millimeter wave and some microwave systems do not penetrate walls very effectively. Thus, an IR, acoustic, and/or microwave/millimeter wave system can be used in the system 100 to locate the dog 101 without having a map of the house or kennel. Radio-based systems that operate at frequencies that penetrate walls can be used in connection with a map of the house In one embodiment, the IR system is replaced or augmented by a sonic or ultrasonic system. In one embodiment, the operation of the sonic or ultrasonic system is similar to that of the IR system except that the waves are sound waves instead of infrared waves. In one embodiment, the frequency of the sound waves used is above the frequency that can be heard by dogs or cats and thus, does not disturb the animals. Although not immune to blind spots, the sonic or ultrasonic system is typically less susceptible to blind spots than the infrared system.

In one embodiment, the sonic or ultrasonic system includes a ranging function similar to that of an RF system. In one embodiment, the ranging function uses a two-frequency phase comparison system to measure distance from the sound transmitter to the sound receiver.

In one embodiment, the IR system 301 can be used to send IR signals to the video cameras 106.

In one embodiment, the dog 101 is contained in the containment area by 130 by a boundary wire antenna. The animal system 102 receives encoded pseudo-random electromagnetic signals from the boundary wire antenna and a correction stimulus is applied when the dog 101 moves near to and through the containment wire antenna to the "outside" area. In one embodiment, the animal system 102 sends a warning message to the computer system 103 when the dog 101 gets too near the boundary wire antenna. If the dog moves outside the boundary area, the correction capability is disabled by the computer system 103 to allow the dog reentry into the containment area, without receiving correction. The correction capability is then restored by the computer system 103.

In one embodiment, the boundary wire is configured as two or more wires arranged as an inner wire (or wires) and an outer wire (or wires). The collar detects the transmissions from the two or more wires using amplitude and/or phase comparisons to determine if the dog is closer to the inner wire(s) and, therefore, inside the boundary, or closer to the outer wire(s) and, therefore, outside the boundary.

In one embodiment, the collar determines the strength of the containment signal to find out how close the dog 101 is to the containment fence. If the signal strength falls within a warning range, a negative training stimulus (e.g., a shock, vibration, etc.) is provided to deter further movement in that direction. Should this fail and the containment signal grows stronger, signaling a move closer towards the fence, then a stronger negative stimulus is provided (e.g., a stronger shock). If the dog 101 chooses to ignore the warnings and moves over the containment fence, then the change in phase of the containment signal indicates that the dog is outside the containment area If the dog moves outside the range of the containment signal and outside the containment area, the collar provides a voice message (for example, "GO HOME!") from the loudspeaker 206. If the dog 101 moves back towards the containment fence to return within the containment region 130 and the containment signal is received by the animal system 102, the animal system 102 sends a message to the computer system 103 that the dog is outside the containment area and moving in. This tells the computer system 103 to cancel the audible beep (or voice message) and suppresses any stimulus to allow the dog to return. When the dog returns within the containment fence and within the allowed region, computer system 103 and animal system 102 resume normal operation.

In embodiment, the dog can be trained to remain within the containment area 130 using GPS. A GPS boundary 130 is configured the computer system 103 and provided to the animal system 102. The dog's position is obtained several times per second. When the dog's location is too close to the edge of the boundary 130, the correction sequence is initiated.

When the dog moves towards or exits the boundary of the containment area 130, the animal system 102 performs the containment function as described above with various warnings and corrections. The GPS boundary can be used with or without a boundary wire. The IMU 303 can be used with intermittent updates by the GPS system 303 as described above.

In one embodiment, the system 100 locates the dog periodically (e.g., communicates with the animal system 102) and alerts the owner/trainer if the dog cannot be found (e.g., if the system 100 cannot contact the animal system 102). In one embodiment, the system 100 locates the dog and alerts the owner/trainer if the dog has escaped or is in an area that is off-limits to the dog.

In one embodiment, the system 100 is configured to keep two or more dogs (or cats) apart (e.g., to avoid fights or interference with play, training, etc.). In one embodiment, the system 100 uses the microphone 204 to detect sounds corresponding to a dog (or cat) fight and applies corrective punishment to stop the fight and prevent future fights.

Figure 4:
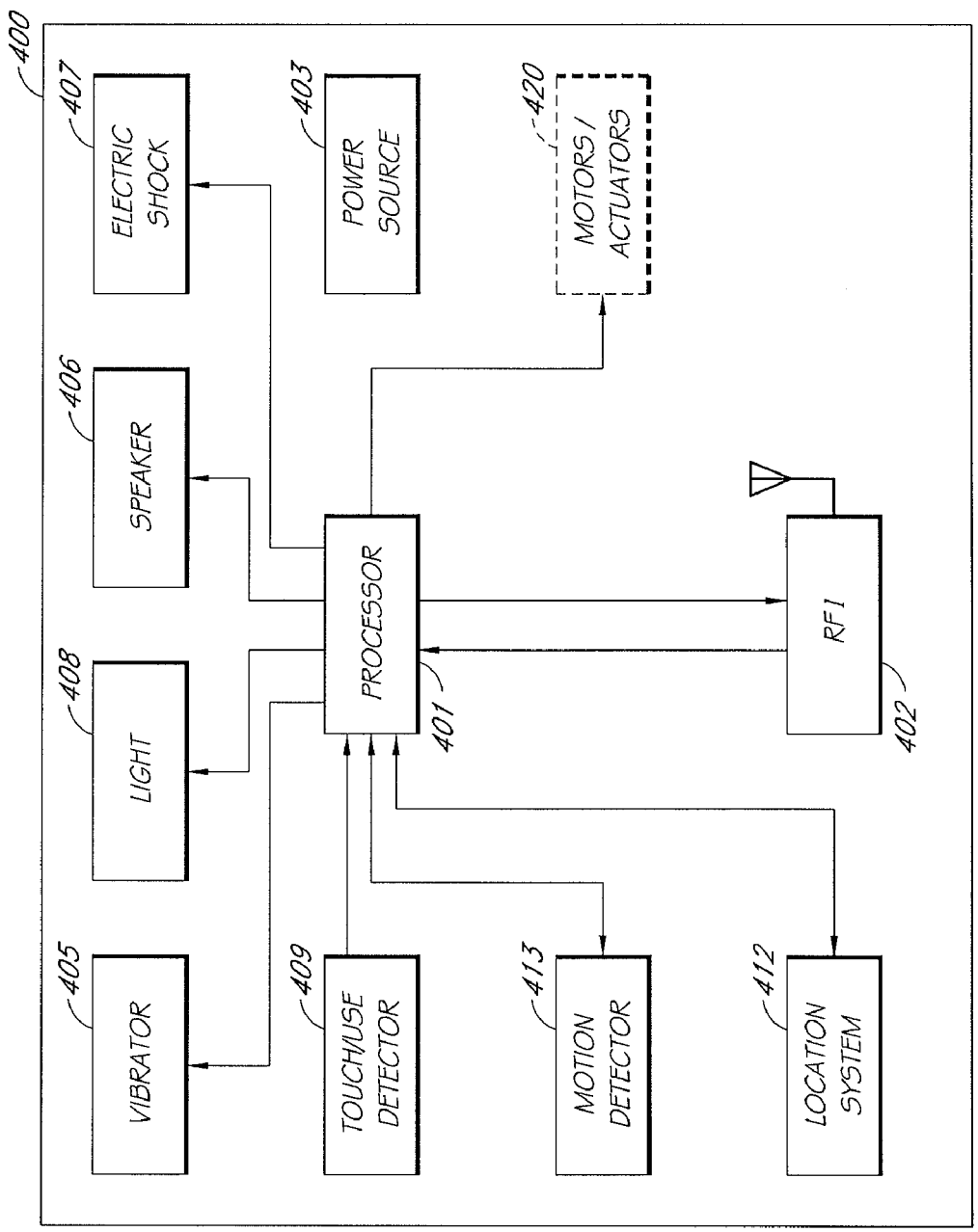
FIG. 4 is a block diagram of a dog toy.

FIG. 4 is a block diagram of a dog toy 400, such as, for example, the dog toys 114-116 shown in FIG. 1. In the toy 400, a sound sensing device (e.g., a microphone) 404, a vibration device 405, a sound producing device (e.g., a loudspeaker) 406, an electric shock device 407, a light 408, a touch detector 409, a motion detector 413, and a first RF transceiver 402 are provided to a processor 401. A sound sensing device (not shown) can also be provided to the processor 201. The sound producing device is configured to produce sound waves (sonic and/or ultrasonic) such as, for example, a loudspeaker, a transducer, a buzzer, a clicker, etc. For convenience, and without limitation, the sound producing device 406 is referred to herein as a loudspeaker 406. A power source 403 provides power for powering the vibration device 405, the loudspeaker 406 the electric shock device 407, the first RF transceiver 402, the light 408, the touch detector 409, the motion detector 413, and the processor 201. In one embodiment, each of the sound producing device (not shown), the vibration device 405, the loudspeaker 406 and the electric shock device 407 are separately optional and each can be omitted depending on the desired system configuration. The toy 400 can also include an odor dispensing device (not shown) for providing pleasant or unpleasant smells so the dog 101. The toy 400 can also include the light 408 for providing visual indications to the dog 101, to the trainer, or to the video cameras 106. The light 408 can be configured as one or more incandescent lights, one or more LEDs, one or more strobe lights, etc. In one embodiment, the toy 400 also includes one or more location and tracking devices, such as, for example, the IR system 301, the GPS 302, the IMU 303, and or the third RF transceiver 304 described in connection with FIG. 3. An optional motion actuator 402 can be used to provide motion of a portion of the toy (e.g., to move a string for playing with a cat, a ball launcher for launching a ball for a dog to fetch, etc.) or to move the entire toy (e.g., to move the toy about the room or yard as part of the dog's training or as part of a game to entertain the dog).

As part of a training system or game, the computer system 103 instructs the dog 101 to get a selected toy. The computer system can use the light 408 and/or the loudspeaker 406 to attract the attention of the dog 101. If the dog selects the right toy, then the touch sensor 409 and/or the motion detector 413 sense the dog's selection and the information is communicated back to the computer system 103. If the dog selects the right toy, then the computer system 103 can reward the dog. If the dog selects the wrong toy, then the computer system 103 can use the vibrator 405, the electric shock device 407, or unpleasant sounds from the loudspeaker 406 to provide negative reinforcement to the dog 101. In one embodiment, the computer system uses negative reinforcement judiciously, if at all, based on a training program that punishes the dog when the training program deems punishment is constructive. In one embodiment, the training program running on the computer system 103 learns the characteristics and temperament of the dog 101 and uses such knowledge in making a decision regarding punishment. In one embodiment, a trainer configures the computer system 103 to punish the dog 101 in various circumstances and to forego punishment in other circumstances. In one embodiment, the computer system 103 reads the RFID tag 310 (though the animal system 102) to establish the identity of the dog 101 and to load the proper training parameters for the dog 101.

In one embodiment, the dog toys 114-116 include one or more obstacle course-type devices that allow the dog to jump through hoops, over bars, up ramps, etc. The computer 103 guides the dog through the obstacle course using lights and/or sounds provided on the obstacle course devices. In one embodiment, the system 100 uses the video system 106 to track the dog through the obstacle course. In one embodiment, the obstacle course devices are provided with sensors 409 to register the passage of the dog and the system tracks the dog through the obstacle course by the device sensors. In one embodiment, the obstacle course includes a hoop wherein the sensor 409 is configured as an optical interrupter that detects the passage of the dog through the hoop when the dog breaks an optical beam across the hoop.

The system 100 can run the dog through an obstacle course that includes several such obstacles by varying the course, speed through the course, etc. The system 100 can record the dog's ability to run the course, the dog's speed through the course, etc. by sensing as the dog passes over or through each obstacle.

In one embodiment, the elements of FIG. 4 are configured as a generic electronics module that can be provided to dog toys provided by the owner/trainer.

In one embodiment, the system 100 can be used to communicate with the dog through phonetic sounds, such as, for example, through bark recognition. The system 100 receives feedback regarding the dogs movements, actions, and environments, and can thus, learn various aspects of the dog's behavior and vocabulary. In addition, the system 100 can interact with the dog to train the dog using a desired vocabulary or set of phonetic sounds. In one embodiment, the system 100 is configured to recognize sounds made by the dog (e.g., barking, whimpering, cries of pain, choking sounds, etc.) the microphone in the animal system 102 and the signal processing capabilities in the animal system 102 and in the processor 130. This dog "speech recognition" system can base its discrimination on acoustic features, such as, for example, format structure, pitch, loudness, spectral analysis, etc. When the computer recognizes the message behind the sounds made by the dog, then the system 130 can respond accordingly, either by providing a message to the owner/trainer or by taking action in the dog's environment. Thus, for example, if the dog emits a cry of pain, a choking sound, or the like, the system 130 will raise an alarm and attempt to contact the owner or trainer. In one embodiment, the system 130 is provided with communications access (e.g., Internet access, cellular telephone access, pager access, etc.) to contact the owner/trainer. In an alternate example, if the dog makes a sound indicating that it needs to be let out, then the system 130 can release a latch on the dog door 111.

In one embodiment, the system 100 recognizes the speech of dog 101 and thus, if a strange dog or other animal enters the area and makes sounds, the system 100 can recognize that a strange dog or other animal is in the area and take appropriate action (e.g., lock the dog door 111, notify the owner/trainer, etc.)

Communicating commands or instructions to a dog typically involve training because dogs do not instinctively understand human language. In one embodiment, the system 100 trains the dog 101 using human speech commands, thus allowing the owner/trainer to easily interact with the dog 101. In one embodiment, the system 100 also communicates with the dog 101 using sounds (e.g., bark-like sounds) that are more similar to a dog's instincts. Thus, in one embodiment, the system 100 produces sounds (e.g., barking sounds, etc.) that a dog will understand more easily than human speech.

In one embodiment, the system 100 cares for the dog's well being when the owner/trainer is away, asleep, or otherwise occupied. Thus, for example, if the dog 101 makes a sound and/or motions indicating that it is bored, or wants to play, the system 100 will initiate a game with the dog. In one embodiment, one or more of the toys 114-116 are self-propelled (or can throw a ball) and the system 100 can play games such as "fetch" with the dog 101. During the game, the dog is rewarded by pleasing sounds, encouraging comments, treats from the treat dispenser 122 etc. Several videos are currently available for entertaining dogs, but playing such videos requires manual interaction by the owner/trainer. In one embodiment, the audio-video display system (105,107) is used to play videos of other dogs playing, and thus, entertaining and holding the dog's attention. In one embodiment, the system 100 plays a video when the dog indicates that is it bored or wants to play.

In one embodiment, the system 100 uses the sensors 129 to monitor ambient conditions such as, for example, indoor temperature, outdoor temperature, rain, humidity, precipitation, daylight, etc. In one embodiment, the system 103 uses such information to look after the dogs well being. Thus, for example, if the system 100 determines that is it raining or too hot outside, the system 100 can call the dog inside (using, for example, the loudspeaker on the animal system 102) and latch the dog door 111. Using the daylight sensor and/or time of day available from the computer 103, the system 100 can be used to manage the dog differently depending on whether it is light or dark outside, morning or evening, etc. Thus, for example, the system 100 can be instructed to allow the dog more leeway for barking during the day than during the night. For example, in one embodiment, if the system 100 senses that the dog is barking during the day, the system can use mild correction to stop the barking. By contrast, if the system senses that the dog is barking at night, then the system can instruct the dog to go inside and/or apply relatively stronger correction.

Figure 6A:
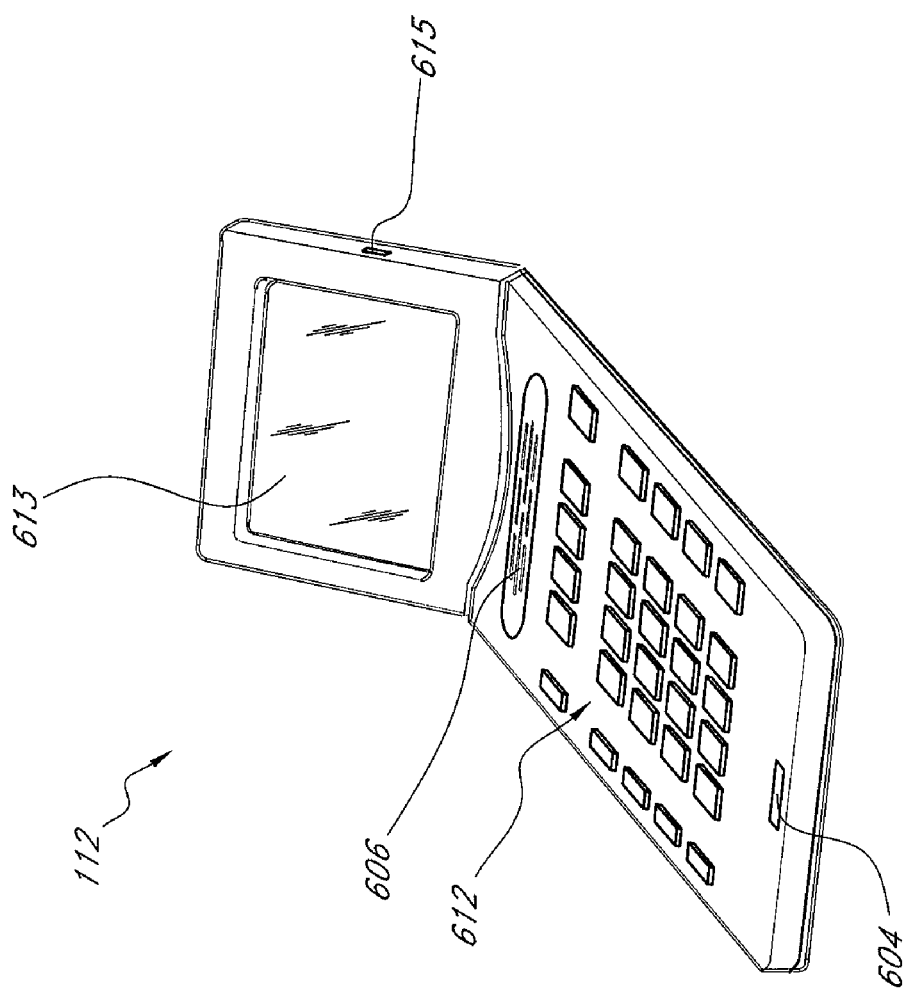
FIG. 6A shows a remote control for controlling the functions of the training and management system and for displaying data from the training and management system.
Figure 6B:
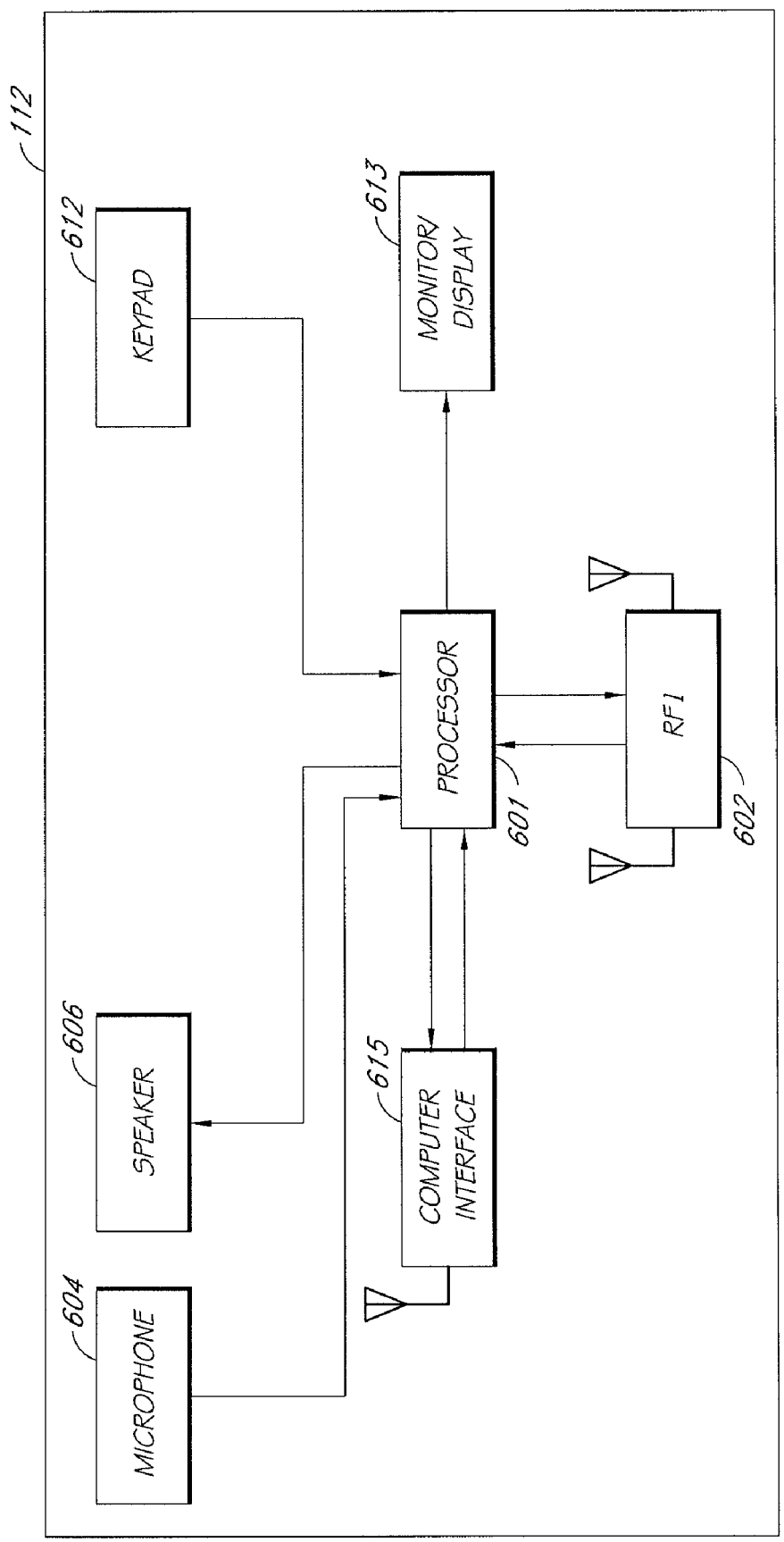
FIG. 6B is a block diagram of the remote control.

FIG. 6 is a block diagram of the remote control 112 for controlling the system 100 and for receiving information from the system 100. The remote control 112 includes a microphone 604, a loudspeaker 606, a keyboard (or keypad) 612, a display 613, and a first RF transceiver 602, all provided to a processor 601.

The remote control 112 communicates with the computer system 103 using the RF transceiver 602 to receive status information and to send commands to the system 100. Using the remote control 112, the owner/trainer can check on the location, health, and status of the dog 101. The owner/trainer can also use the remote control 112 to send commands to the system 100 and to the dog 101. For, example, using the microphone 604, the owner/trainer can speak to the dog 101. In one embodiment, the computer system 103 sends display information to the display 613 to show the location of the dog 101. If the location of the dog cannot be ascertained, the system 100 can send a "dog not found" message and attempt to contact the owner/trainer using the network connection 108, the modem 130, and/or the remote control 112. If the system 100 determines that the dog has escaped, the system 100 can send a "dog lost" message and attempt to contact the owner/trainer using the network connection 108, the modem 130, and/or the remote control 112.

Figure 7:
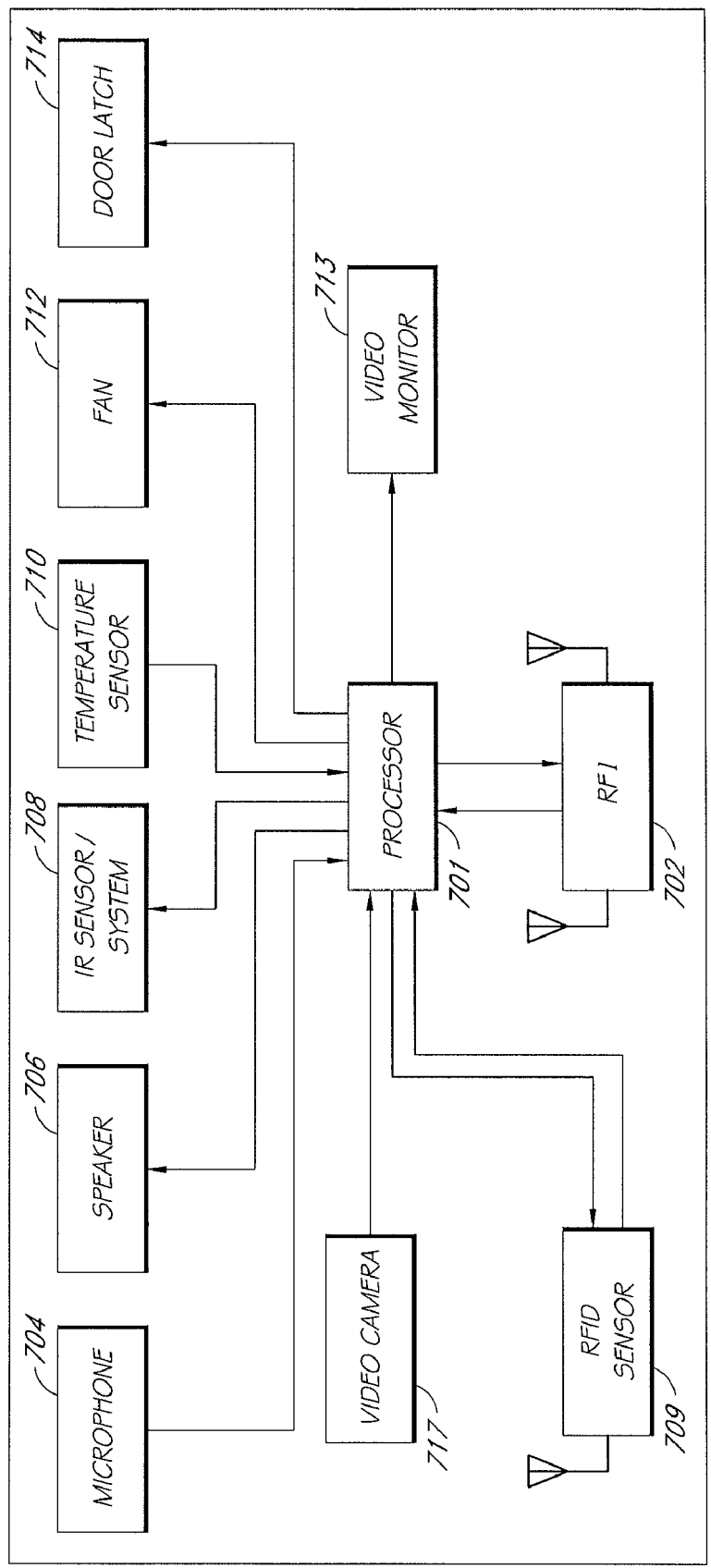
FIG. 7 is a block diagram of the dog house system.

FIG. 7 is a block diagram of the dog house system 119 that includes a microphone 704, a loudspeaker 706, an IR sensor 701, a temperature sensor 710, a ventilation fan 711, a video monitor 713, a first RF transceiver 702, a second RF transceiver 709, and a video camera 717, all provided to a processor 701. The microphone 704, the loudspeaker 706, the IR sensor 701, the temperature sensor 710, the ventilation fan 711, the video monitor 713, the first RF transceiver 702, the second RF transceiver 709, and the video camera 717 are separately optional items and each can be omitted depending on the configuration and capabilities desired in the dog house system 119.

The dog house 119 includes many of the functions of the animal system 102. Typically, the dog house 119 has more power available than the animal system 102. Thus, the dog house 119 can take over many of the function of the animal system 102 when the dog 101 is inside or near the dog house 119. For example, the dog house 119 can interrogate the dog's RFID chip 310, can provide communications to the computer system 103, can listen for barking or other sounds, etc. Thus, in one embodiment, the computer system 103 selectively instructs the processor 201 to disable (e.g., power down) functions of the animal system 102 that can be handled by the dog house 119. Other functions, such as using the IMU 303 to detect head movements of the dog that cannot be handled by the dog house 119 remain active. In one embodiment, the video camera 717 is used in connection with video signal processing and image recognition to replace some or all of the functions of the IMU for tracking the dog 101 or sensing head movements while the dog 101 is in the doghouse 119.

The video monitor 713 can be used to provide visual commands to the dog. The video camera 717 can be used to provide a video feed (e.g., regular scan video, slow scan video, single frame video, etc.) to the owner or trainer thereby, allowing the owner to keep watch over the dog 101 from a remote location on the remote control 112. In one embodiment, one or more audio/video systems (e.g., video monitors and loudspeakers) are provided with wireless receivers and provided throughout the house or yard to provide audio/visual commands to the dog. One or more video cameras can be used to provide a video feed (e.g., regular scan video, slow scan video, single frame video, etc.) to the owner or trainer thereby allowing the owner to keep watch over the dog 101 from a remote location on the remote control 112.

The temperature sensor 710 is used to monitor the temperature of the dog house 119. The fan 711 provides ventilation when the temperature in the doghouse 119 gets too warm. The fan can be controlled locally by the processor 701 or remotely by the computer system 103 by sending commands to the processor 701. The door latch 712 allows the monitoring system 100 to lock the dog 101 inside or out of the dog house as desired.

In one embodiment, the RF transceiver 702 provides a repeater function for the dog animal system 102. When the dog 101 is inside the doghouse 119, the RF transceiver is in relatively close proximity to the RF transceiver 202 in the collar, and thus the RF transceiver 202 can be operated in low-power mode to conserve power in the animal system 102.

Figure 5:
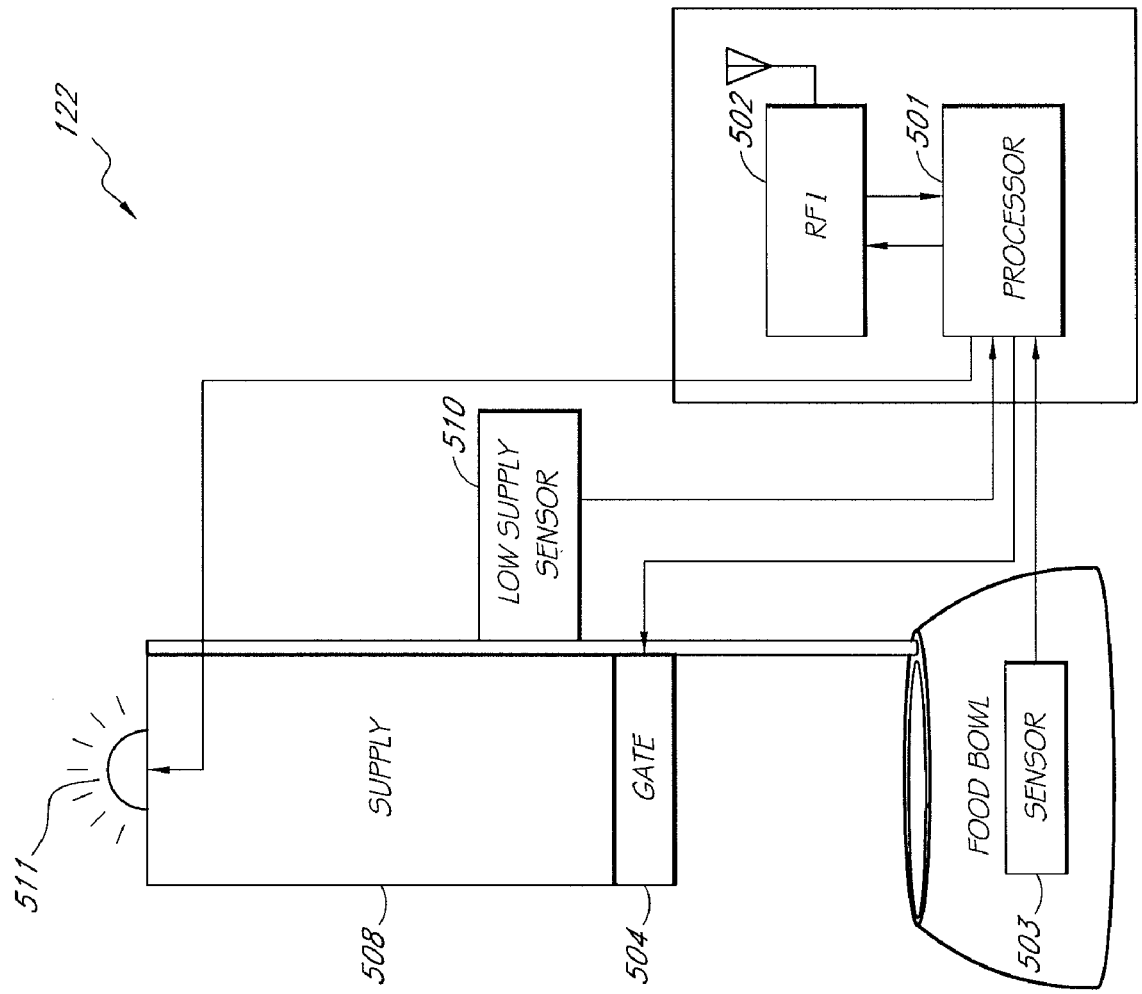
FIG. 5 is a block diagram of the treat dispenser.

FIG. 5 is a block diagram of the treat dispenser 122. In the dispenser 122, a first RF transceiver 502, a treat sensor 503, a low-supply sensor 510, and a gate 504 are provided to a processor 501. On command from the computer system 103, the processor 501 controls the gate 504 to release a treat (or medicine, vitamin, etc.) from a reservoir 508. The sensor 503 senses when the dog 101 has retrieved the treat. The low-supply sensor 510 senses when the supply of treats is running low. When the supply of treats is running low, the computer system 103 alerts the trainer or owner. In one embodiment, if the supply is not replenished, then the computer system changes its algorithm to reduce the number of treats given and thereby extend the supply of treats. An optional signaling device 511 (e.g., a light and/or audio output device) is also provided to the processor 501 to allow the computer system 103 to signal to the dog 101 that a treat is available. In multiple-dog environments, the sensor 505 includes a short-range RFID sensor to detect which dog retrieved the treat (or medicine, vitamin, etc.).

In one embodiment, the treat dispenser 112 is built into the animatronics trainer 123 so that the dog will perceive the animatronics trainer 123 as the source of the treats.

Figure 8A:
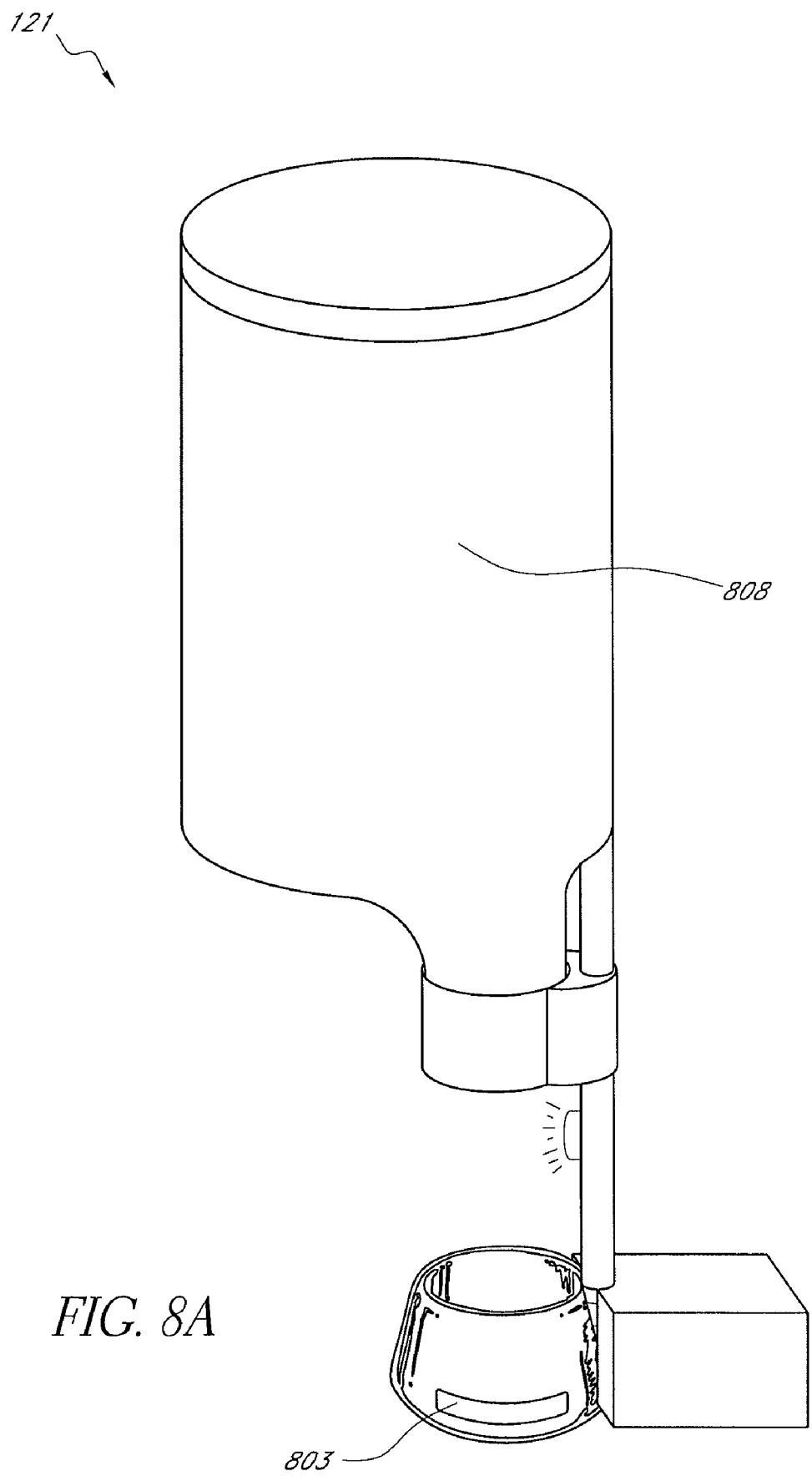
FIG. 8A is a diagram of the food dispenser.
Figure 8B:
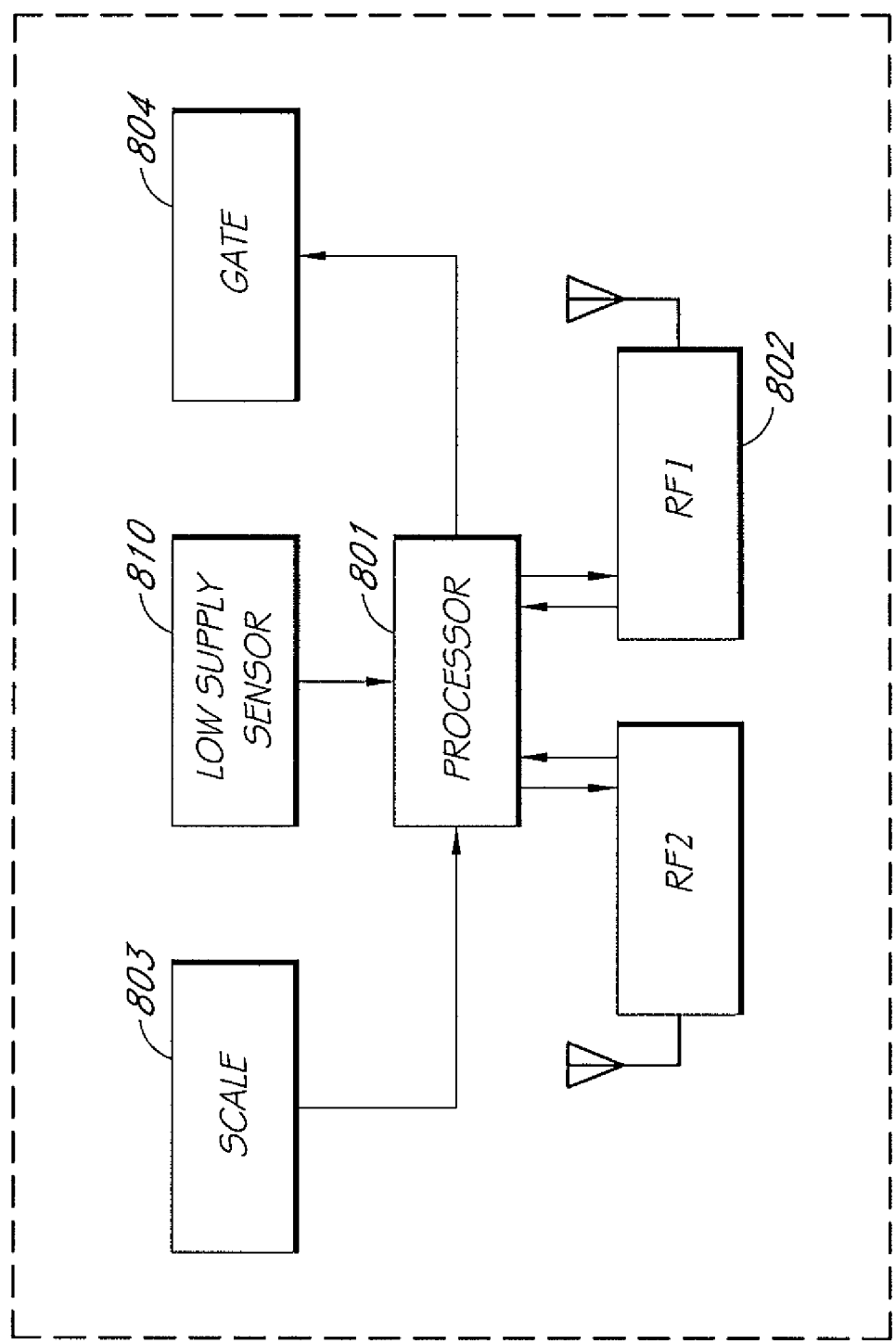
FIG. 8B is a block diagram of the food dispenser.

FIG. 8A is a diagram of the food dispenser 121, and FIG. 8B is a block diagram of the food dispenser 121. In the food dispenser 121, a first RF transceiver 802, a food bowl sensor 803, a low-supply sensor 810, and a gate 804 are provided to a processor 801. On command from the computer system 103, the processor 801 controls the gate 804 to release food from a reservoir 808 into a bowl 820. The sensor 803 senses the amount of food in the bowl 820. As the dog 101 eats the food, the sensor 803 senses the lowered level of food in the bowl and the processor 801 reports the food consumption back to the computer system 103. The low-supply sensor 810 senses when the supply of food in the reservoir 808 is running low and reports the low-food condition back to the central processor 103 In multiple-dog environments, the sensor 803 includes a short-range RFID sensor to detect which dog retrieved the treat.

The food dispenser 121 allows the computer system 103 to track the dog's food consumption and consumption patterns (e.g., time of day, amount per feeding, etc.). The system 103 can count calories for the dog 101 make sure that the dog is not overeating or under-eating. In one embodiment, food is delivered in measured amounts at specified times.

In one embodiment, the sensor 803 includes a scale that is used to measure the amount of food that goes into and out of the bowl by measuring the weigh of food into and out of the bowl.

In one embodiment, the food dispenser 121 can be configured to deliver different types of food for different dogs. (e.g., puppy food, diet food, old-dog food, etc.). The system 100 dispenses the proper type and amount of food depending on which dog is at the food dispenser.

Figure 9:
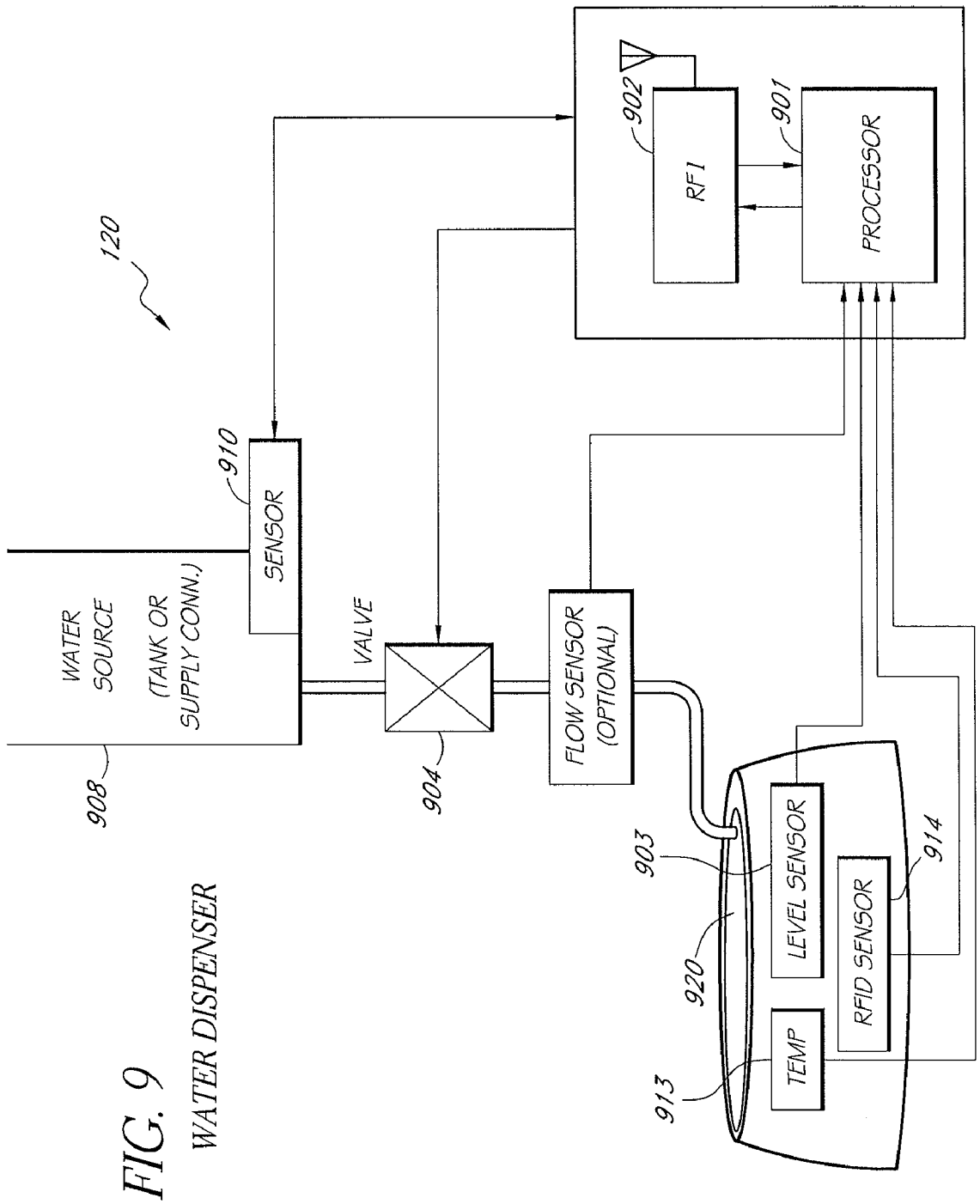
FIG. 9 is a block diagram of the water dispenser.

FIG. 9 is a block diagram of the water dispenser 120. In the water dispenser 120, a first RF transceiver 902, a water level sensor 903, a water temperature sensor 913, a low-supply sensor 910, and a valve 904 are provided to a processor 901. On command from the computer system 103, the processor 901 controls the valve 904 to release water from a water supply 908 into a bowl 920. The water supply 908 can be a water reservoir, a plumbing connection, a garden hose connection, etc. In one embodiment, a pressure reducer is provided to reduce the pressure of the water supplied to the valve 904. The sensor 903 senses the amount of water in the bowl 920. As the dog 101 drinks the water, the sensor 903 senses the lowered level of water in the bowl and the processor 901 reports the water consumption back to the computer system 103. If the water supply 908 is provided by a reservoir, then a low-supply sensor 910 senses when the supply of water in the reservoir 908 is running low and reports the low-water condition back to the central processor 103 The temperature sensor 913 is used to detect the temperature of the water in the bowl 920. In multiple-dog environments, a short-range RFID sensor 914 is provided to detect which dog is drinking.

The water dispenser 120 allows the computer system 103 to track the dog's water consumption and consumption patterns (e.g., time of day, amount of water, etc.). The system 103 make sure that the dog is getting enough water and watch for patterns of high water consumption. If the temperature of the water in the bowl 920 (as measured by the temperature sensor 913) is too high, then the processor 901 can flush the bowl with fresh water (in the case of a plumbing connection) or send a message to the computer system 103 (in the case of a reservoir).

The food dispenser 121 and water dispenser 120 allow the owner/trainer to leave the dog unattended for a period of time. In one embodiment, the computer system 103 contacts the owner if the food dispenser 121 runs low on food, if the water dispenser 120 runs low on water, or if the computer 103 cannot make contact with the dispensers 120,121. In one embodiment, the owner/trainer can specify the threshold value for determining at what point the system 100 warns the owner of low food or water supplies. Thus, for example, if the owner is relatively close by (e.g., at work) the threshold can be set relatively low since the dog would not be without food or water for very long if the supply runs out. By contrast, if the owner is relatively far away (e.g., out of town) then the threshold can be set relatively high since the dog would potentially be without food or water for an extended time if the supply runs out.

Figure 10:
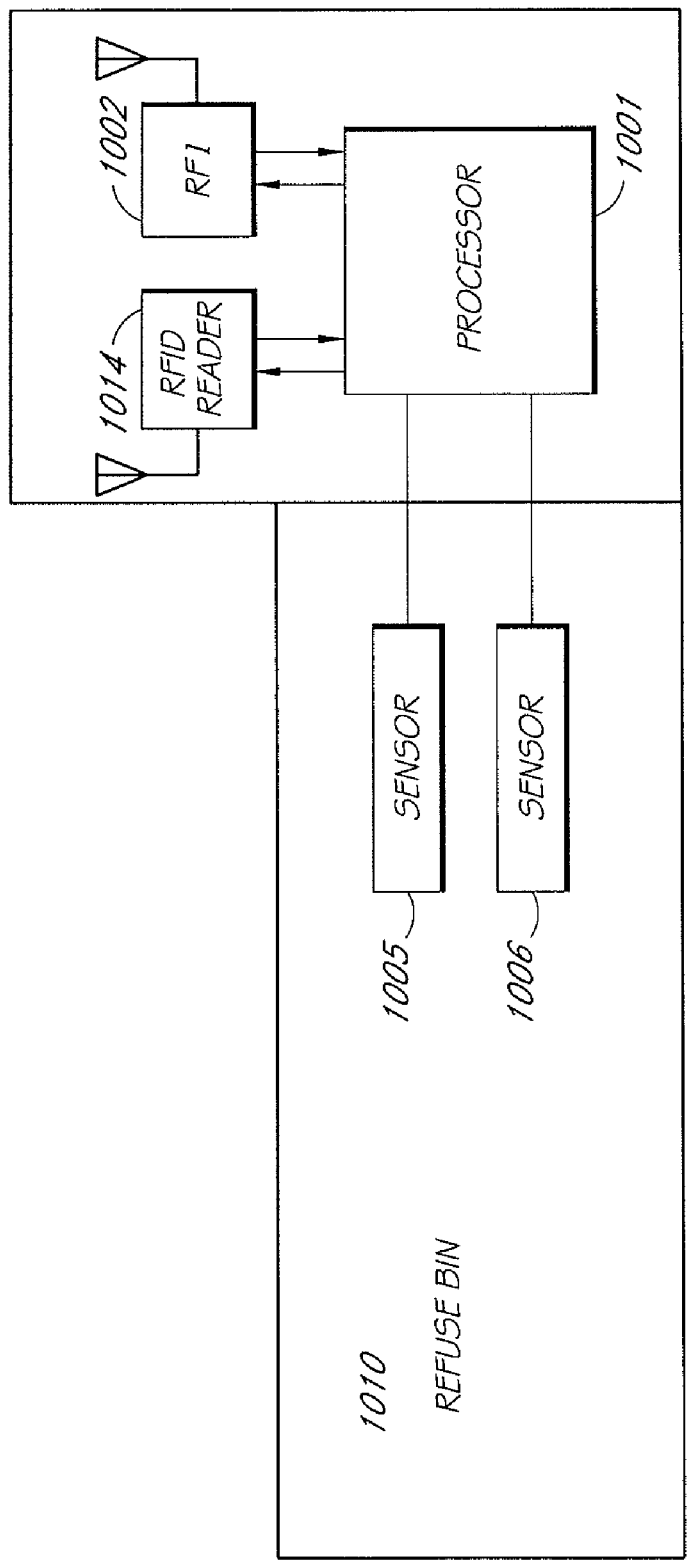
FIG. 10 is a diagram of one embodiment of the dog toilet.

FIG. 10 is a diagram of one embodiment of the dog toilet system 117 that includes an optional RFID sensor 1014, a refuse bin 1010, a urination sensor 1005, and a refuse sensor 1006 provided to a processor 1001. The dog toilet 117 tracks the dog's patterns and disposes of refuse. The short-range RFID sensor 1014 is used to distinguish between multiple dogs In one embodiment, the computer system 103 uses the biometric data available from the RFID tag 310, the water consumption data from the water dispenser 120, the food consumption data from the food dispenser 121, and/or the data from the dog toilet 117 to monitor the health and well being of the dog 101 on a real-time basis and on a long-term basis. Since the system 100 can be configured in a flexible manner (e.g., the owner/trainer may or may not have included the water dispenser 120, the food dispenser 121, etc.) different configurations of the system 100 will have different data available. The system 100 uses whatever data is available in making the health and welfare determinations. Thus, for example, if the system 100 only has data from the animal system 102, then the health and well-being information will be based on the information from the animal system 102. As more capability is added to the system 100 (e.g., the owner/trainer adds additional monitoring capabilities) then the system 100 expands the analysis of health and well-being to use the additional data when appropriate. The computer system 103 can collect long-term behavior on the dogs 101 and produce plots and charts for the owner/trainer to allow for long-term health monitoring. Moreover, the computer system 103 can watch for changes in the long-term trends that could indicate health problems. Thus, for example, if the dog 101 is normally active at various times throughout the day and suddenly becomes inexplicably inactive, the computer 103 would inform the owner/trainer that the dog may be sick. In another example, if the food or water consumption patters of the dog 101 changes significantly, then the system 100 can inform the owner/trainer.

In one embodiment, the compute system 103 keeps data concerning the calories consumed by the dog. In one embodiment, the compute system 103 keeps data concerning the number and types of corrective treatments given to the dog and the reasons therefore (e.g., what the dog was doing that caused the system to give a corrective treatment). In one embodiment, the compute system 103 keeps data concerning the number of and types of positive reinforcements given to the dog and the reasons therefore. In one embodiment, the compute system 103 keeps data concerning the amount of time the dog spends training, playing, sleeping, etc. In one embodiment, the system 100 keeps data concerning dog barking (when, how long, how loud, etc.). The system 100 can produce plots and charts of barking behavior to help the owner/trainer in breaking the dog of barking behavior. In one embodiment, the system 100 can be instructed to contact the owner/trainer when the dog is barking. The owner can remotely talk to the dog (e.g., through the telephone) and try to quiet the dog.

In one embodiment, the system 100 uses ambient weather information as part of the health and well-being analysis. For example, a modest increase in water consumption and a decrease in activity levels during hot weather is generally expected, whereas an increase in food consumption is generally expected during relatively cold weather. Thus, in one embodiment, the system 100 takes such weather-related consumption patterns into account when making decisions about reporting a change in consumption patterns.

In one embodiment, many of the sensors and dog interaction devices in the system 100 are configured as wireless devices. Wireless devices are generally easier to install since they do not require wiring to communicate with the computer system 103. Moreover, items, such as the toys 114-116 that are moveable are easier for the dog to play with if they do not have a wired connection back to the computer system 103. The use of wireless devices also allows easy expansion of the system 100 since new wireless devices can automatically identify themselves to the computer system 103, thus, allowing many aspects of the system 100 to be auto-configured. For example, in one embodiment the treat dispenser 122 automatically identifies itself to the computer system 103, thus, informing the system 103 that treats are available for training the dog. The system 103 uses training without treats from the dispenser 122 when the dispenser 122 is not provided, has run out of treats, or has run out of battery power. Conversely, the system 103 can use training with treats when the dispenser 122 is available, and has enough battery power and treats.

The sensors 129 can be configured as wired or wireless sensors and can include, for example, sensors to measure ambient conditions, such as, for example, smoke, temperature, moisture, wind velocity, precipitation, water, water temperature, humidity, carbon monoxide, natural gas, propane gas, security alarms, intrusion alarms (e.g., open doors, broken windows, open windows, and the like), other flammable gases, radon, poison gasses, etc. Different sensor units can be configured with different sensors or with combinations of sensors.

The wireless units of the system 100, such as, for example, the dispensers 120-122, the toys 114-116, the dog house 119, the animal system 102, etc. each include a transceiver for wireless communication. These items communicate with the computer system 103 either directly through the RF base unit 104 or through one or more repeaters 113. The use of the repeaters 113 provides extended range and allows the various RF units to be dispersed throughout the house, yard, farm field, etc. In one embodiment, the repeaters are configured to be plugged into a wall outlet or otherwise provided with sufficient power. In one embodiment, one or more of the repeaters 113 are solar powered with batteries to provide operation during the night or on cloudy days. In one embodiment, the use of repeaters 113 allows the various RF units 102, 114-122 to operate at relatively lower power in order to conserve available power. In one embodiment, the transmit power of the transceivers in the RF units 102, 114-122 is adjustable, and the transmit power of each transceivers is reduced to that sufficient to provide relatively reliable communication with at least one repeater 113 (or the base unit 104). In one embodiment, the RF units 102, 114-122 use a two-way handshaking communication with the base unit 104 wherein messages set to the base unit 104 are acknowledged by the base unit 104 and messages sent by the base unit 104 to the RF units 102, 114-122 are acknowledged by the respective RF units. The use of handshaking acknowledgement that a message has been received increases the reliability of the wireless communication system and often allows the wireless devices to operate at relatively lower power.

Each of the wireless units of the system 100, such as, for example, the dispensers 120-122, the toys 114-116, the dog house 119, the animal system 102, etc. includes a wireless communication transceiver 202 for communication with the base unit 104 (or repeater 113). Thus, the discussion that follows generally refers to the animal system 102 as an example, and not by way of limitation. Similarly, the discussion below generally refers to the base unit 104 by way of example, and not limitation. It will also be understood by one of ordinary skill in the art that repeaters 113 are useful for extending the range of the animal system 102 but are not required in all configurations.

When the animal system 102 detects a reportable condition (e.g., barking, choking, dog outside established boundaries, dog temperature too high or too low, dog moving though a doorway, etc.) the animal system 102 communicates with the repeater unit 113 and provides data regarding the occurrence. The repeater unit 113 forwards the data to the base unit 104, and the base unit 104 forwards the information to the computer 103. The computer 103 evaluates the data and takes appropriate action. If the computer 103 determines that the condition is an emergency, then the computer 103 contacts the owner/trainer through telephone communication, Internet, the remote 112, the monitor 108, the computer monitor, etc. If the computer 103 determines that the situation warrants reporting, but is not an emergency, then the computer 103 logs the data for later reporting to the owner/trainer when the owner/trainer requests a status report from the computer 103.

In one embodiment, the animal system 102 has an internal power source (e.g., battery, solar cell, fuel cell, etc.). In order to conserve power, the animal system 102 is normally placed in a low-power mode. In one embodiment, using sensors that require relatively little power, while in the low power mode the animal system 102 takes regular sensor readings and evaluates the readings to determine if a condition exists that requires data to be transmitted to the central computer 103 (hereinafter referred to as an anomalous condition). In one embodiment, using sensors that require relatively more power, while in the low power mode the animal system 102 takes and evaluates sensor readings at periodic intervals. Such sensor readings can include, for example, sound samples from the microphone 204, location readings from the location sensors 301, 302, 303, and/or 304, physiological readings from the RFID tag 310, etc.) If an anomalous condition is detected, then the animal system 102 "wakes up" and begins communicating with the base unit 104 through the repeater 113. At programmed intervals, the animal system 102 also "wakes up" and sends status information (e.g., power levels, self diagnostic information, etc.) to the base unit 104 and then listens for commands for a period of time. In one embodiment, the animal system 102 also includes a tamper detector. When tampering with the animal system 102 is detected (e.g., someone has removed the animal system 102 or the dog has somehow gotten out of the animal system 102, etc.), the animal system 102 reports such tampering to the base unit 104.

In one embodiment, the animal system 102 provides bi-directional communication and is configured to receive data and/or instructions from the base unit 104. Thus, for example, the base unit 104 can instruct the animal system 102 to perform additional measurements, to go to a standby mode, to wake up, to report battery status, to change wake-up interval, to run self-diagnostics and report results, etc. In one embodiment, the animal system 102 reports its general health and status on a regular basis (e.g., results of self-diagnostics, battery health, etc.). The computer system 103 can also program instructions into the animal system 102, such as, for example, the boundary areas for the dog, the allowable physiological parameters for the dog (e.g., the "normal" temperature range, etc.). If the sensors in the animal system 102 later detect that a sensed condition is out of range (e.g., dog is out of boundary area, temperature is too high, etc.) then the collar will communicate the out-of-range information to the computer system 103. In one embodiment, the computer system 103 can also program the operating parameters of the animal system 102, such as, for example, the sleep period between sensor measurements, the power level for the transmitter, the code used for spread spectrum transmissions, etc. In one embodiment, the computer system 103 can also program various signal processing information into the animal system 102, such as, for example, the coefficients and/or algorithms used to recognize the dog's vocalizations (e.g., barking, whimpering, cries of pain, choking, etc.).

In one embodiment, the animal system 102 samples, digitizes, and stores audio data from the microphone 204 when such data exceeds a volume threshold and/or when other sensors indicate that the audio data should be digitized and stored. For example, choking sounds are often not very loud, but are often accompanied by distinctive head movements. In one embodiment, the animal system 102 digitizes audio data from the microphone when the IMU 303 detects head movements that are suggestive of choking, gagging, regurgitating, etc. In one embodiment, the animal system 102, having less processing power than the computer system 103, transmits the sampled audio data and related IMU data to the computer 103 for further processing. In one embodiment, the animal system 102 performs initial threshold tests on the audio data 102 to determine if the character of the audio data and/or IMU data justify the use of available power in the collar to transmit the data to the computer system 103. If the animal system 102 determines that the digitized audio data is relatively unlikely to be important, then the animal system 102 can save power by not transmitting the data to the computer 103.

In one embodiment, the computer system 103 can instruct the animal system 102 to automatically apply a correction (e.g., vibration, shock, unpleasant sound, unpleasant smell, etc.) to the dog if the animal system 102 detects that the dog is barking. In one embodiment, the computer system 103 instruct the animal system 102 to not automatically apply a correction to the dog if the animal system 102 detects that the dog is barking, but rather to send a "dog is barking" message to the computer system 103 in order to allow the computer system 103 (or the owner/trainer) to make the decisions regarding correction. In one embodiment, the computer system 103 instruct the animal system 102 to automatically apply a particular correction to the dog if the animal system 102 detects that the dog is barking and to send a "correction applied" message to the computer system 103 in order to allow the computer system 103 to keep track of the corrections that have been applied. If the computer system 103 deems that more severe correction is warranted, then the computer 103 sends a new command to the animal system 102 to change the type or severity of the correction. In one embodiment, the computer system 103 sends a "good dog" message to the dog (through the speaker 206) when the dog stops barking.

In one embodiment, the animal system 102 provides two wake-up modes, a first wake-up mode for taking sensor measurements (and reporting such measurements if deemed necessary), and a second wake-up mode for listening for commands from the central computer 103. The two wake-up modes, or combinations thereof, can occur at different intervals.

In one embodiment, the animal system 102 use spread-spectrum techniques to communicate with the repeater unit 113. In one embodiment, the animal system 102 uses Code Division Multiple Access (CDMA) techniques. In one embodiment, the animal system 102 uses frequency-hopping spread-spectrum. In one embodiment, the animal system 102 has an address or identification (ID) code that distinguishes the animal system 102 from the other RF units of the system 100. The animal system 102 attaches its ID to outgoing communication packets so that transmissions from the animal system 102 can be identified by the repeater 113. The repeater 113 attaches the ID of the animal system 102 to data and/or instructions that are transmitted to the animal system 102. In one embodiment, the animal system 102 ignores data and/or instructions that are addressed to other RF units.

In one embodiment, the animal system 102 includes a reset function. In one embodiment, the reset function is activated by a reset switch on the animal system 102. In one embodiment, the reset function is activated when power is applied to the animal system 102. In one embodiment, the reset function is activated when the animal system 102 is connected to the computer system 103 by a wired connection for programming. In one embodiment, the reset function is active for a prescribed interval of time. During the reset interval, the transceiver 202 is in a receiving mode and can receive the identification code from the computer 103. In one embodiment, the computer 103 wirelessly transmits a desired identification code. In one embodiment, the identification code is programmed by connecting the animal system 102 to the computer through an electrical connector, such as, for example, a USB connection, a firewire connection, etc. In one embodiment, the electrical connection to the animal system 102 is provided by sending modulated control signals (power line carrier signals) through a connector used to connect the power source 203. In one embodiment, the external programmer provides power and control signals.

In one embodiment, the animal system 102 communicates with the repeater 113 on the 900 MHz band. This band provides good transmission through walls and other obstacles normally found in and around a building structure. In one embodiment, the animal system 102 communicates with the repeater 113 on bands above and/or below the 900 MHz band. In one embodiment, the animal system 102, repeater 113, and/or base unit 104 listen to a radio frequency channel before transmitting on that channel or before beginning transmission. If the channel is in use, (e.g., by another device such as another repeater, a cordless telephone, etc.) then the sensor, repeater, and/or base unit changes to a different channel. In one embodiment, the animal system 102, repeater, and/or base unit coordinate frequency hopping by listening to radio frequency channels for interference and using an algorithm to select a next channel for transmission that avoids the interference. Thus, for example, in one embodiment, if the animal system 102 senses a dangerous condition (e.g., the dog 101 is choking or crying in pain) and goes into a continuous transmission mode, the animal system 102 tests (e.g., listens to) the channel before transmission to avoid channels that are blocked, in use, or jammed. In one embodiment, the animal system 102 continues to transmit data until it receives an acknowledgement from the base unit 104 that the message has been received. In one embodiment, the collar transmits data having a normal priority (e.g., status information) and does not look for an acknowledgement, and the collar transmits data having elevated priority until an acknowledgement is received.

The repeater unit 113 is configured to relay communications traffic between the animal system 102 and the base unit 104. The repeater unit 113 typically operates in an environment with several other repeater units. In one embodiment, the repeater 113 has an internal power source (e.g., battery, solar cell, fuel cell, etc.). In one embodiment, the repeater 113 is provided to household electric power. In one embodiment, the repeater unit 113 goes to a low-power mode when it is not transmitting or expecting to transmit. In one embodiment, the repeater 113 uses spread-spectrum techniques to communicate with the base unit 104 and with the animal system 102. In one embodiment, the repeater 113 uses frequency-hopping spread-spectrum to communicate with the base unit 104 and the animal system 102. In one embodiment, the repeater unit 113 has an address or identification (ID) code and the repeater unit 113 attaches its address to outgoing communication packets that originate in the repeater (that is, packets that are not being forwarded).

In one embodiment, the base unit 104 communicates with the animal system 102 by transmitting a communication packet addressed to the collar unit 102. The repeaters 113 receive the communication packet addressed to the collar unit 102. The repeaters 113 transmit the communication packet addressed to the animal system 102 to the collar unit 102. In one embodiment, the collar unit 102, the repeater units 113, and the base unit 104 communicate using Frequency-Hopping Spread Spectrum (FHSS), also known as channel-hopping.

Frequency-hopping wireless systems offer the advantage of avoiding other interfering signals and avoiding collisions. Moreover, there are regulatory advantages given to systems that do not transmit continuously at one frequency. Channel-hopping transmitters change frequencies after a period of continuous transmission, or when interference is encountered. These systems may have higher transmit power and relaxed limitations on in-band spurs. FCC regulations limit transmission time on one channel to 1200 milliseconds (averaged over a period of time 10-20 seconds depending on channel bandwidth) before the transmitter must change frequency. There is a minimum frequency step when changing channels to resume transmission.

In one embodiment, the collar unit 102, the repeater unit 110, and the base unit 104 communicate using FHSS wherein the frequency hopping of the collar unit 102, the repeater unit 110, and the base unit 104 are not synchronized such that at any given moment, the animal system 102 and the repeater unit 113 are on different channels. In such a system, the base unit 104 communicates with the animal system 102 using the hop frequencies synchronized to the repeater unit 113 rather than the collar unit 102. The repeater unit 113 then forwards the data to the collar unit using hop frequencies synchronized to the collar unit 102. Such a system largely avoids collisions between the transmissions by the base unit 104 and the repeater unit 110.

In one embodiment, the RF units 102, 114-122 use FHSS and are not synchronized. Thus, at any given moment, it is unlikely that any two or more of the units 102, 114-122 will transmit on the same frequency. In this manner, collisions are largely avoided. In one embodiment, collisions are not detected but are tolerated by the system 100. If a collision does occur, data lost due to the collision is effectively re-transmitted the next time the collar units transmit collar data. When the units 102, 114-122 and repeater units 113 operate in asynchronous mode, then a second collision is highly unlikely because the units causing the collisions have hopped to different channels. In one embodiment, the unit 102, 114-122, repeater units 113, and the base unit 104 use the same hop rate. In one embodiment, the units 102, 114-122, repeater units 113, and the base unit 104 use the same pseudo-random algorithm to control channel hopping, but with different starting seeds. In one embodiment, the starting seed for the hop algorithm is calculated from the ID of the units 102, 114-122, repeater units 113, or the base unit 104.

In an alternative embodiment, the base unit 104 communicates with the animal system 102 by sending a communication packet addressed to the repeater unit 113, where the packet sent to the repeater unit 113 includes the address of the collar unit 102. The repeater unit 113 extracts the address of the animal system 102 from the packet and creates and transmits a packet addressed to the collar unit 102.

In one embodiment, the repeater unit 113 is configured to provide bi-directional communication between the animal system 102 and the base unit 104. In one embodiment, the repeater 113 is configured to receive instructions from the base unit 104. Thus, for example, the base unit 104 can instruct the repeater to: send commands to the animal system 102; go to standby mode; "wake up"; report power status; change wake-up interval; run self-diagnostics and report results; etc.

The base unit 104 is configured to receive measured collar data from a number of RF units either directly, or through the repeaters 113. The base unit 104 also sends commands to the repeater units 113 and/or to the animal system 102. When the base unit 104 receives data from the animal system 102 indicating that there may be an emergency condition (e.g., the dog is in distress) the computer 103 will attempt to notify the owner/trainer.

In one embodiment, the computer 104 maintains a database of the health, power status (e.g., battery charge), and current operating status of all of the RF units 102, 114-122 and the repeater units 113. In one embodiment, the computer 103 automatically performs routine maintenance by sending commands to each unit 102, 114-122 to run a self-diagnostic and report the results. The computer 103 collects and logs such diagnostic results. In one embodiment, the computer 103 sends instructions to each RF unit 102, 114-122 telling the unit how long to wait between "wakeup" intervals. In one embodiment, the computer 103 schedules different wakeup intervals to different RF units based on the unit's health, power status, location, usage etc. In one embodiment, the computer 103 schedules different wakeup intervals to different collar units based on the type of data and urgency of the data collected by the unit (e.g., the animal system 102 has higher priority than the water unit 120 and should be checked relatively more often). In one embodiment, the base unit 104 sends instructions to repeaters 113 to route collar information around a failed repeater 113.

In one embodiment, the computer 103 produces a display that tells the owner/trainer which RF units need repair or maintenance. In one embodiment, the computer 103 maintains a list showing the status and/or location of each dog 101 according to the ID of each collar. In one embodiment, the ID of the animal system 102 is obtained from the RFID chip embedded in the dog 101. In one embodiment, the ID of the animal system 102 is programmed into the collar by the computer system 103. In one embodiment, the ID of the animal system 102 is programmed into the collar at the factory such that each collar has a unique ID.

In one embodiment, the animal system 102 and/or the repeater units 113 measure the signal strength of the wireless signals received (e.g., the animal system 102 measures the signal strength of the signals received from the repeater unit 113, the repeater unit 113 measures the signal strength received from the animal system 102 and/or the base unit 104). The collar unit 102 and/or the repeater units 113 report such signal strength measurement back to the computer 103. The computer 103 evaluates the signal strength measurements to ascertain the health and robustness of the RF units of the system 100. In one embodiment, the computer 103 uses the signal strength information to re-route wireless communications traffic in the system 100. Thus, for example, if the repeater unit 113 goes offline or is having difficulty communicating with the collar unit 102, the computer 103 can send instructions to a different repeater unit In the animal system 102, the controller 202 typically provides power, data, and control information to the transceiver 201. A power source 203 is provided to the controller 201. An optional tamper sensor (not shown) is also provided to the controller 201. A reset device (e.g., a switch) is proved to the controller 201.

In one embodiment, the transceiver 202 is based on a TRF 6901 transceiver chip from Texas Instruments. Inc. In one embodiment, the controller 201 is a conventional programmable microcontroller. In one embodiment, the controller 201 is based on a Field Programmable Gate Array (FPGA), such as, for example, provided by Xilinx Corp. In one embodiment, the collar 201 includes a smoke detector. In one embodiment, the animal system 102 includes a temperature sensor to measure ambient temperature. In one embodiment the animal system 102 includes a water sensor.

The controller 202 receives collar data from the sensors and systems in the animal system 102. The animal system 102 generally conserves power by not transmitting sensor data that falls within a normal range unless the animal system 102 is being interrogated by the compute system 103. In one embodiment, the controller 202 evaluates sensor data by comparing the data value to a threshold value (e.g., a high threshold, a low threshold, or a high-low threshold). If the data is outside the threshold (e.g., above a high threshold, below a low threshold, outside an inner range threshold, or inside an outer range threshold), then the data is deemed to be anomalous and is transmitted to the base unit 104. In one embodiment, the data threshold is programmed into the controller 202. In one embodiment, the data threshold is programmed by the base unit 104 by sending instructions to the controller 202. In one embodiment, the controller 202 obtains collar data and transmits the data when commanded by the computer 103.

In one embodiment, a tamper sensor 1105 is configured as a switch that detects removal of or tampering with the collar unit 102.

Figure 11:
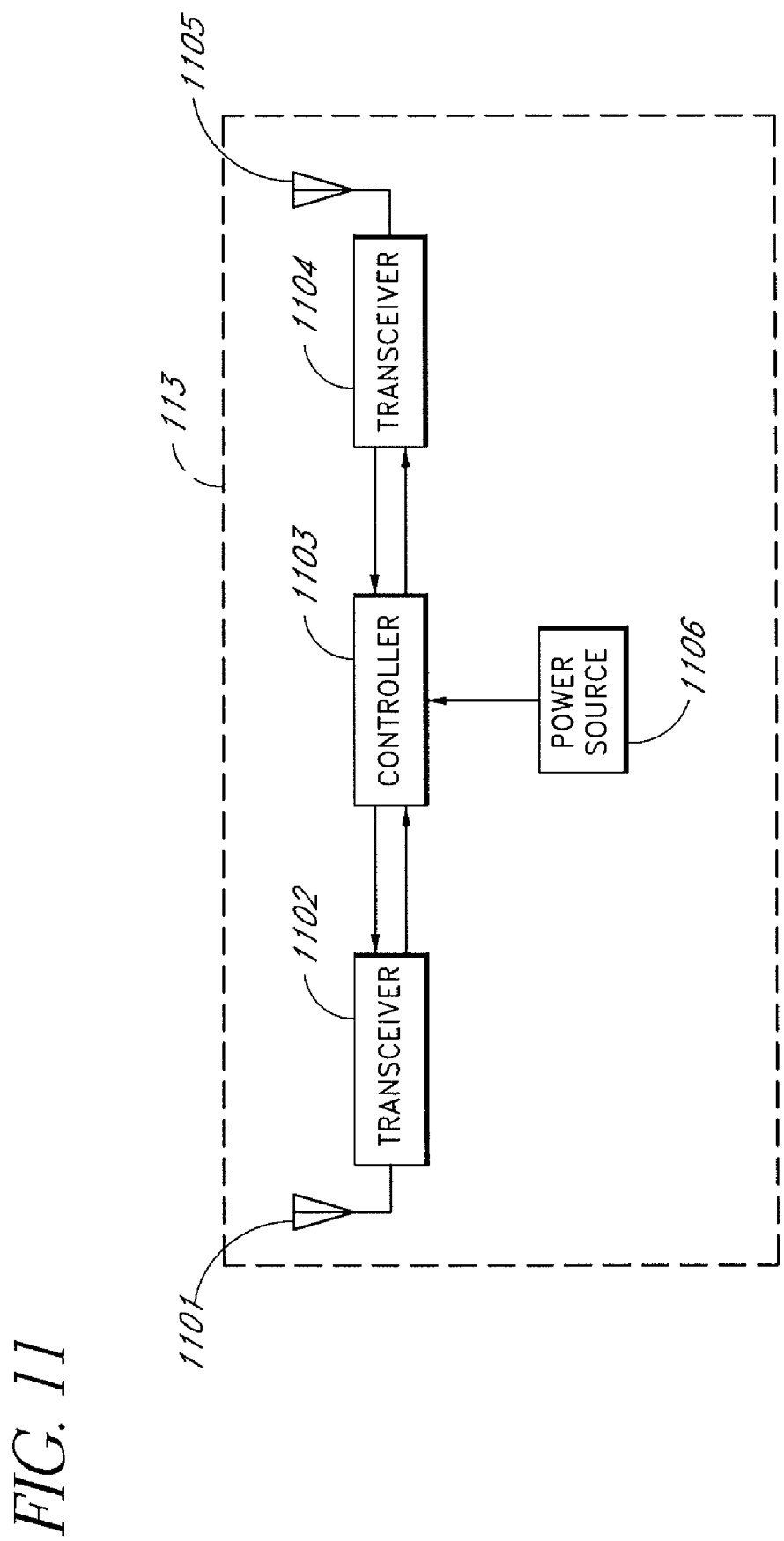
FIG. 11 is a block diagram of a repeater unit.

FIG. 11 is a block diagram of the repeater unit 113. In the repeater unit 113, a first transceiver 1102 and a second transceiver 1105 are provided to a controller 1103. The controller 1103 typically provides power, data, and control information to the transceivers 1102, 1104. A power source 1106 is provided to the controller 1103.

When relaying collar data to the base unit 104, the controller 1103 receives data from the first transceiver 1103 and provides the data to the second transceiver 1104. When relaying instructions from the base unit 104 to a collar unit, the controller 1103 receives data from the second transceiver 1104 and provides the data to the first transceiver 1102. In one embodiment, the controller 1103 conserves power by placing the transceivers 1102, 1104 in a low-power mode during periods when the controller 1103 is not expecting data. The controller 1103 also monitors the power source 1106 and provides status information, such as, for example, self-diagnostic information and/or information about the health of the power source 1106, to the base unit 104. In one embodiment, the controller 1103 sends status information to the base unit 104 at regular intervals. In one embodiment, the controller 1103 sends status information to the base unit 104 when requested by the base unit 104. In one embodiment, the controller 1103 sends status information to the base unit 104 when a fault condition (e.g., battery low, power failure, etc.) is detected.

Figure 12:
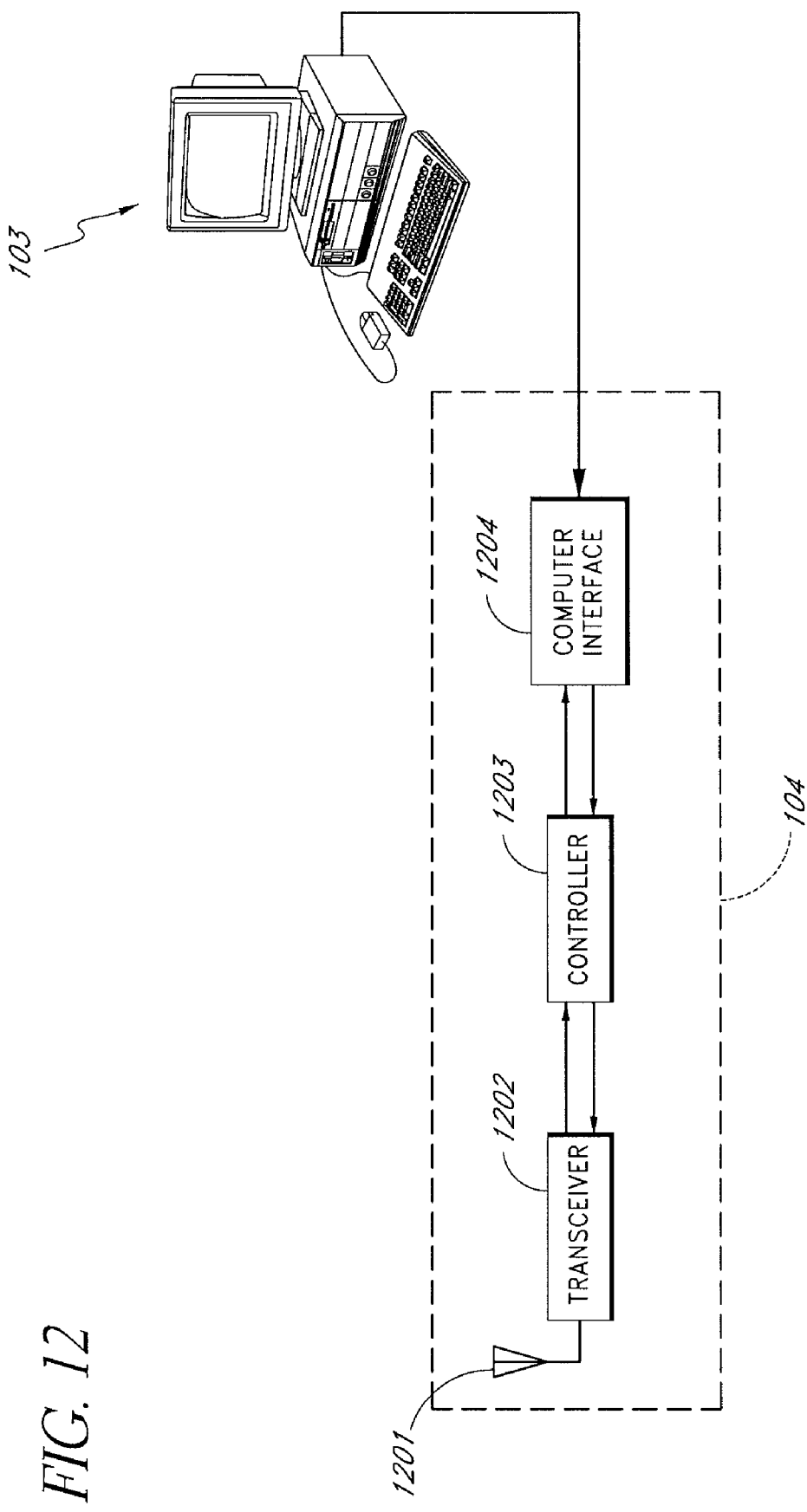
FIG. 12 is a block diagram of the base unit.

FIG. 12 is a block diagram of the base unit 104. In the base unit 104, a transceiver 1202 and a computer interface 1204 are provided to a controller 1203. The controller 1103 typically provides data and control information to the transceivers 1202 and to the interface. The interface 1202 is provided to a port on the monitoring computer 103. The interface 1202 can be a standard computer data interface, such as, for example, Ethernet, wireless Ethernet, firewire port, Universal Serial Bus (USB) port, bluetooth, etc.

In one embodiment, the owner/trainer selects a dog breed for the dog 101 from a list of breeds provided by the computer 103. The computer 103 adjusts the training environment based on the dog breed. Thus, for example, an active dog such as a border collie will receive relatively more training and/or play than a relatively less active dog breed. In one embodiment, the owner/trainer inputs the dog's age, sex, and general health into the computer 103 to allow the computer 103 to adjust the type of training, length of training etc. In one embodiment, the system 103 maintains records of the dogs health (e.g., temperature, heart rate, food consumption, etc.), training patterns and training progress. The computer system 103 can produces plots and graphs showing the dogs progress, comparing the progress of the dog 101 to other dogs, to the dog's progress from previous time periods, (e.g., months, years, etc.). In one embodiment, the computer system 103 evaluates the dog's health and training progress and makes suggestions to the owner/trainer. In one embodiment, the computer system 103 provides answers to questions selected by the owner/trainer from a list of questions and adjusts such answers based on the health and training history of the dog 101. In one embodiment, the computer system 103 forwards to dog's data (e.g. health data, training data, etc.) to a remote trainer who can then give feedback to the dog's owner/trainer. Thus, for example, if the dog 101 is exhibiting destructive behavior the owner/trainer can ask the computer 103 (or, optionally, a remote trainer) for recommendations to cure such behavior and the computer 103 can make recommendations based on the dog's breed, age, training history, etc. If the dog 101 is exhibiting poor training progress the owner/trainer can ask the computer 103 (or, optionally, a remote trainer) for recommendations to cure such behavior and the computer 103 can make recommendations based on the dog's breed, age, training history, etc. If the dog 101 is exhibiting potential health problems, the owner/trainer can ask the computer 103 (or, optionally, a remote veterinarian) for recommendations.

It is well known that most dogs prefer to keep to a relatively fixed daily schedule. The training system 100 is better adapted to maintaining a fixed daily routine than a working owner/trainer who has other responsibilities. Thus, for example, the system 100 can feed the dog prescribed amounts of food at prescribed times of day. The system 100 can play with the dog at prescribed times of day. The system 100 can train the dog at prescribed times of day and allow the dog in or out of the house at prescribed times. After an initial adjustment period, the dog 101 will adjust to the schedule provided by the system 100 and will in general be happier and healthier than a dog that must adjust to an owner's varying schedule. The dog 101 also benefits from the impartiality of the training and management system 100. Unlike an owner/trainer, the system 100 will not get mad at the dog and punish the dog out of anger. In one embodiment, the system 100 provides better training than a typical owner or trainer because the system 100 is provided with a training program designed by an expert. Thus, the system 100 is less likely to punish the dog 101 in a situation where the dog does not understand the reason for the punishment. Moreover, the system 100, is relatively more likely to reward the dog in such a way that the dog understands the reason for the reward and will make the connection between desired behavior and the reward. For example, many untrained owners do not understand that reward should generally occur immediately so that the dog will properly associate action with reward. The system 100 has a relatively high-quality training program built-in and thus alleviates the need for an owner to buy books to study and learn proper dog training methods. In one embodiment, a professional trainer works with the dog 101 for a relatively short period of time in order to get the dog accustomed to the system 100, and then the dog 101 can work with the system 100 for extended periods without supervision.

In one embodiment, a remote trainer can use the Internet or telephone modem to connect to the computer system 103 and remotely train the dog or provide other interaction with the dog.

Figure 13:
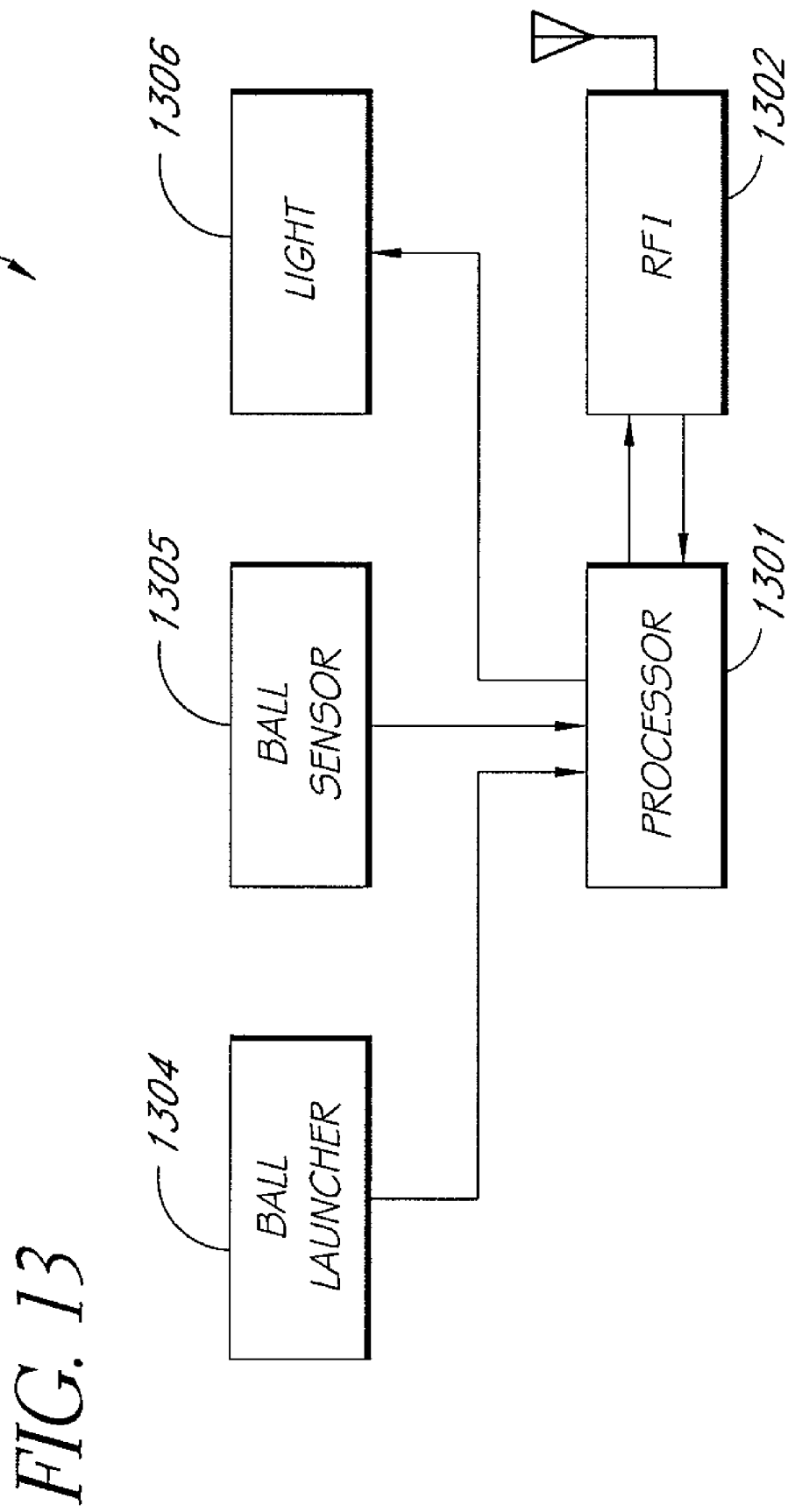
FIG. 13 is a block diagram of a ball tossing unit used to play "fetch" with the dog.

FIG. 13 is a block diagram of a ball tossing unit 1300 used to play "fetch" with the dog. The ball tossing unit 1300 includes a processor 1301 and (optional) RF unit 1302, a ball launcher 1304, a ball sensor 1305, and optionally, a light or sound device 1306. The ball tossing unit 1300 uses the ball launcher 1304 to launch a ball for the dog to fetch. When the dog fetches the ball and drops in a basket or other receptacle in the ball tossing unit 1300, the ball sensor detects the fetched ball 1305. In one embodiment, the ball tossing unit is operated by command from the computer system 103. In one embodiment, the ball tossing unit is operated according to a timer such that the unit plays fetch with the dog at prescribed periods.

Figure 14:
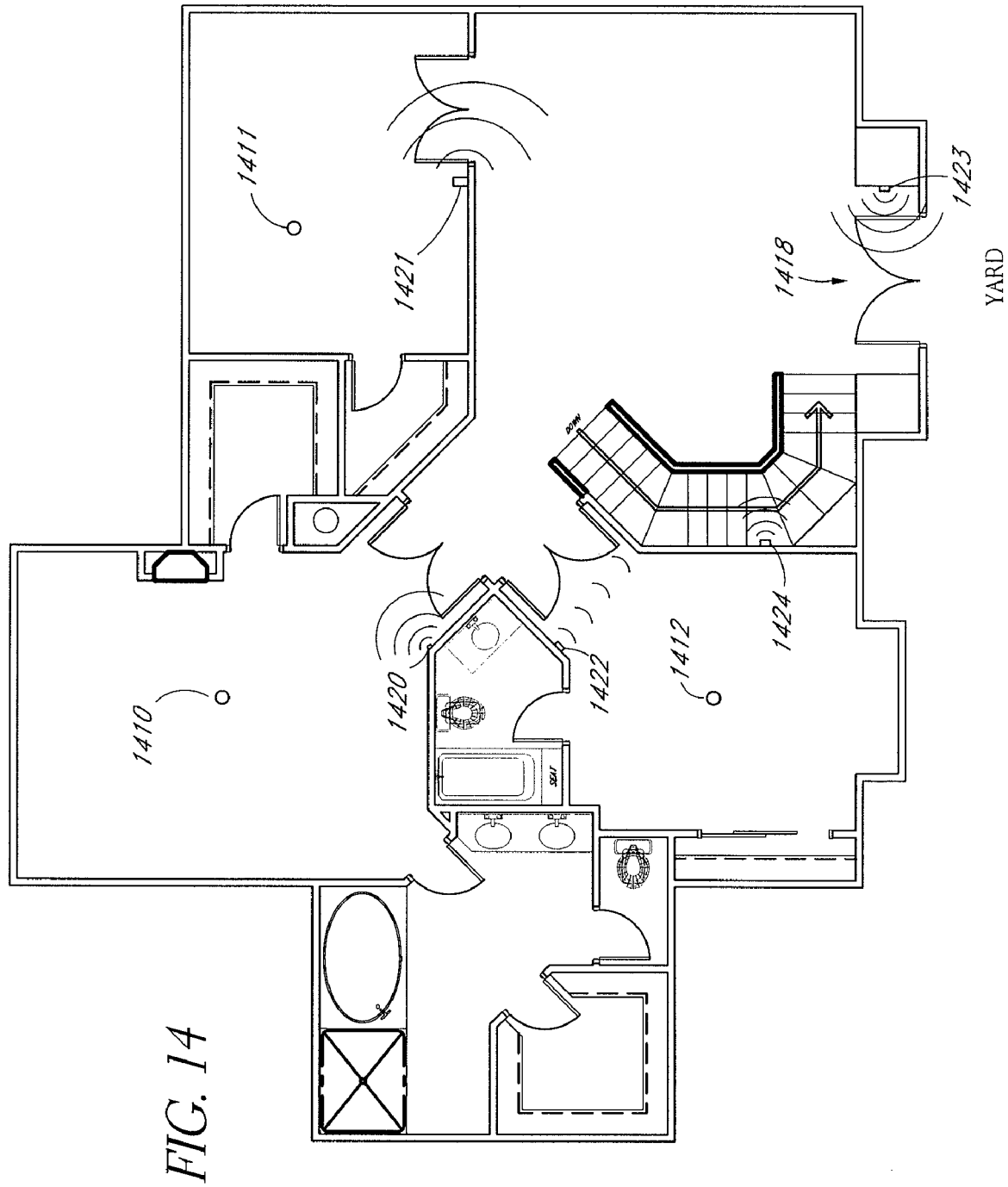
FIG. 14 is a architectural-type drawing of the floor plan of a portion of a house showing examples of placement of location sensors to sense the movement of the dog around the house.

FIG. 14 is a architectural-type drawing of the floor plan of a portion of a house showing examples of placement of locations sensors to sense the movement of the dog around the house. In FIG. 14, relatively short-range sensors are placed in doorways or key passageways (e.g., halls, stairs, etc.) to track the general movement of the dog through the house. Location system units 1420-1423 are placed in or near doorways, and a location system unit 1424 is placed in a stairway.

In one embodiment, the location system units 1420-1424 are (or include) relatively short-range RFID readers that read the passage of the dog's RFID tag as the dog passes by the reader when going through the doorway, hallway, etc. in which the reader is located. The RFID reader reports the movement back to the computer system 103 which keeps a record of the dog's movements and current whereabouts. As with the dog house 119, in one embodiment, the location system units 1420-1424 can perform many of the functions of the animal system 102 such as, for example, reading biometric data from the RFID tag 310. In one embodiment, the animal system 102 is omitted or can be removed from the dog 101 while the dog 101 is in the house. In one embodiment, location system units 1410-1412 are placed relatively high in the room (e.g., on the ceiling) to provide a view of the various rooms of the house.

In one embodiment, the location system units 1420-1424 or 1410-1412 are (or include) infrared sensors that communicate with the infrared system 301 in the animal system 102 to provide relatively short-range relatively line-of sight communication for tracking the movements of the dog. As the dog passes the location system units 1420-1424 or 1410-1412, the sensor communicates with the animal system 102 to note the passage of the dog and the information is then transmitted back to the computer 103 either by the animal system 102 or the location system units 1420-1424 or 1410-1412. In one embodiment, the location system units 1420-1424 or 1410-1412 also operate as motion detectors for a home security system.

In one embodiment, the location system units 1420-1424 or 1410-1412 are (or include) acoustic sensors that communicate with the acoustic systems in the animal system 102 to provide relatively short-range relatively line-of sight communication for tracking the movements of the dog. As the dog passes the location system units 1420-1424 or 1410-1412, the sensor communicates with the animal system 102 to note the passage of the dog and the information is then transmitted back to the computer 103 either by the animal system 102 or the location system units 1420-1424 or 1410-1412. In one embodiment, the location system units 1420-1424 or 1410-1412 also operate as motion detectors for a home security system.

In one embodiment, the location system units 1420-1424 or 1410-1412 are (or include) relatively low-power microwave transmitters or receivers that communicate with the RF system 304 in the animal system 102 to provide relatively short-range relatively line-of sight communication for tracking the movements of the dog. As the dog passes the location system units 1420-1424 or 1410-1412, the sensor communicates with the animal system 102 to note the passage of the dog and the information is then transmitted back to the computer 103 either by the animal system 102 or the location system units 1420-1424 or 1410-1412.

In one embodiment, the computer system 103 is provided with a map of the house and shows the location of the dog with respect to the map.

In one embodiment, the system 100 determines when the dog is sleeping by monitoring the dogs movement and temperature.

In one embodiment one or more of the radio frequency aspects of the system 100 use a frequency band between 800 and 1100 MHz for general communications. In one embodiment, one or more of the radio frequency aspects of the system 100 use frequencies below 800 MHz for emergency or longer-range communication. In one embodiment, the frequency capabilities of the transceivers in the animal system 102 are adjustable, and the base unit 104 and animal system 102 select are configured to use communication frequencies that conserve power while still providing adequate communications reliability. In one embodiment, one or more of the radio frequency aspects of the system 100 use frequencies above 1100 MHz for relatively short-range communication (e.g. communication within a room). In one embodiment, the base unit 104 and/or one or more of the repeaters 113 includes a direction finding antenna for determining a direction of the radiation received from the animal system 102. In one embodiment, the base unit 104 and/or one or more of the repeaters 113 includes an adaptive antenna for increasing antenna gain in the direction of the animal system 102. In one embodiment, the base unit 104 and/or one or more of the repeaters 113 includes an adaptive antenna for canceling interfering noise.

In one embodiment, the animal system 102 includes radio frequency, acoustic and infrared communications capabilities. In one embodiment, the system 100 communicates with the animal system 102 using radio frequency, acoustic or infrared communication depending on the situation, e.g., acoustic, infrared, or relatively higher frequency radio frequencies for relatively shorter range communication and relatively lower frequency radio frequencies for relatively longer range communications.

Figure 15:
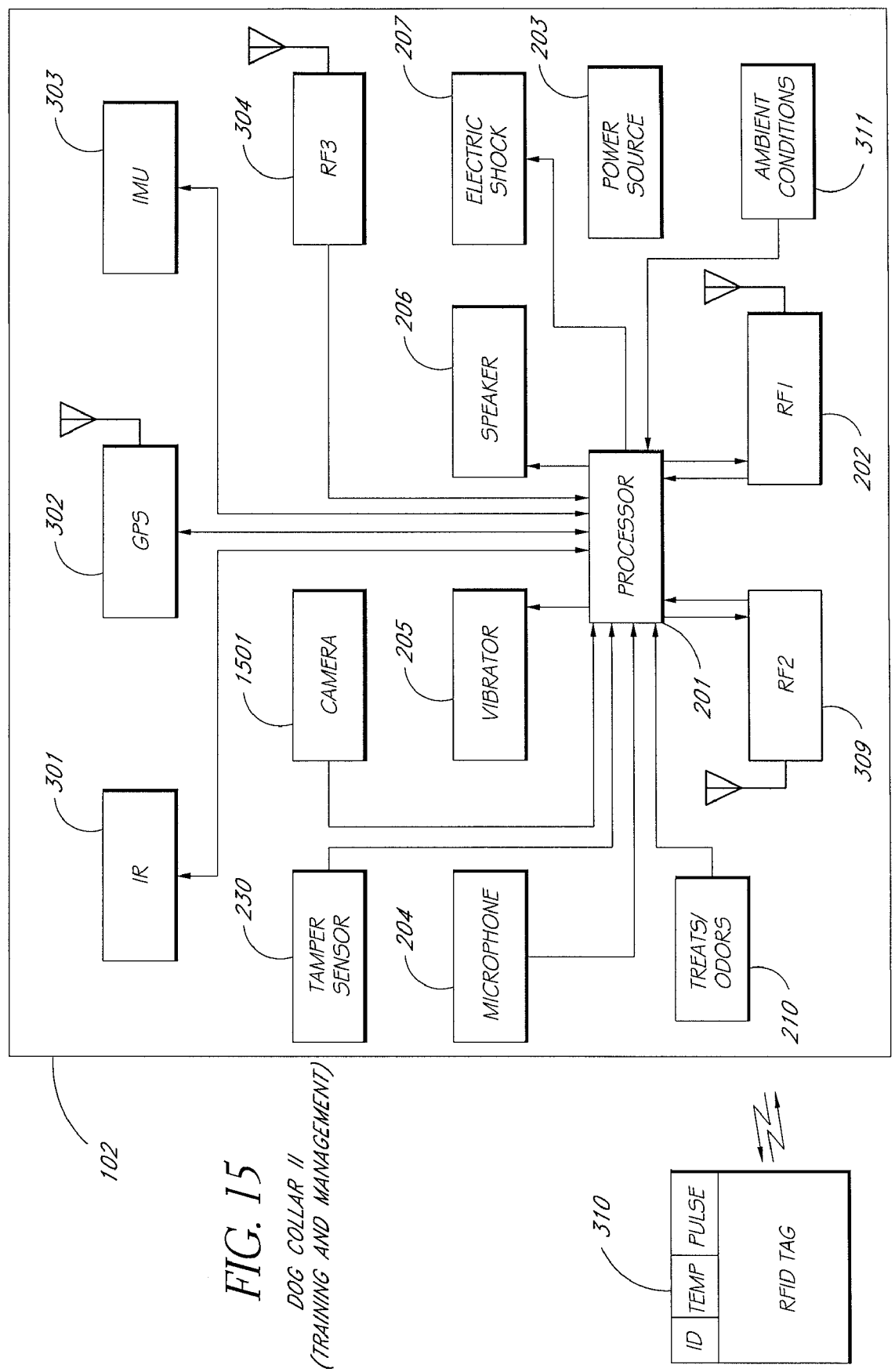
FIG. 15 is a block diagram of a dog collar that includes a camera.

FIG. 15 is a block diagram of the animal system 102 that includes a camera 1501. The block diagram in FIG. 15 includes the elements shown in the block diagram of FIG. 3 with the addition of a camera 1501 provided to the processor 201. In one embodiment, the camera 1501 includes an image sensor that captures still pictures. In one embodiment, the camera 1501 includes an image sensor that produces video images. In one embodiment, images from the camera are provided to the system 103 and stored. In one embodiment, the system 103 sends one or more of the images to the control/display 112 so that the owner or trainer can see the dog's surroundings. In one embodiment, the system 103 sends one or more of the images to a telephone or cellular telephone equipped to receive images (still or video) so that the owner or trainer can see the dog's surroundings by calling the system 103. In one embodiment, the system 103 sends one or more of the images to the Internet 108 or other computer network so that the owner or trainer can see the dog's surroundings using a computer.

In one embodiment, images from the camera are provided to the system 103 at regular intervals. In one embodiment, images from the camera are provided to the system 103 when requested by the system 103. In one embodiment, the system 103 stores images from the camera 1501 at regular intervals. In one embodiment, the system 103 stores images from the camera 1501 during training sessions. In one embodiment, the system 103 stores images from the camera 1501 when the system 103 determines that the dog is in trouble, sick, in pain, etc. In one embodiment, the system 103 stores images from the camera 1501 when the system 103 is unable to locate the dog. In one embodiment, the system 103 stores images from the camera 1501 when the system 103 detects a potentially abnormal situation (e.g., the dog is sick, the dog is barking, the system 103 cannot locate the dog, etc.).

The animal system 102 can be provided to a dog harness 1601 as shown in FIGS. 16A-D. The harness 1601 provides more flexibility in locating the camera 1501 than is provided by a collar.

Figure 16A:
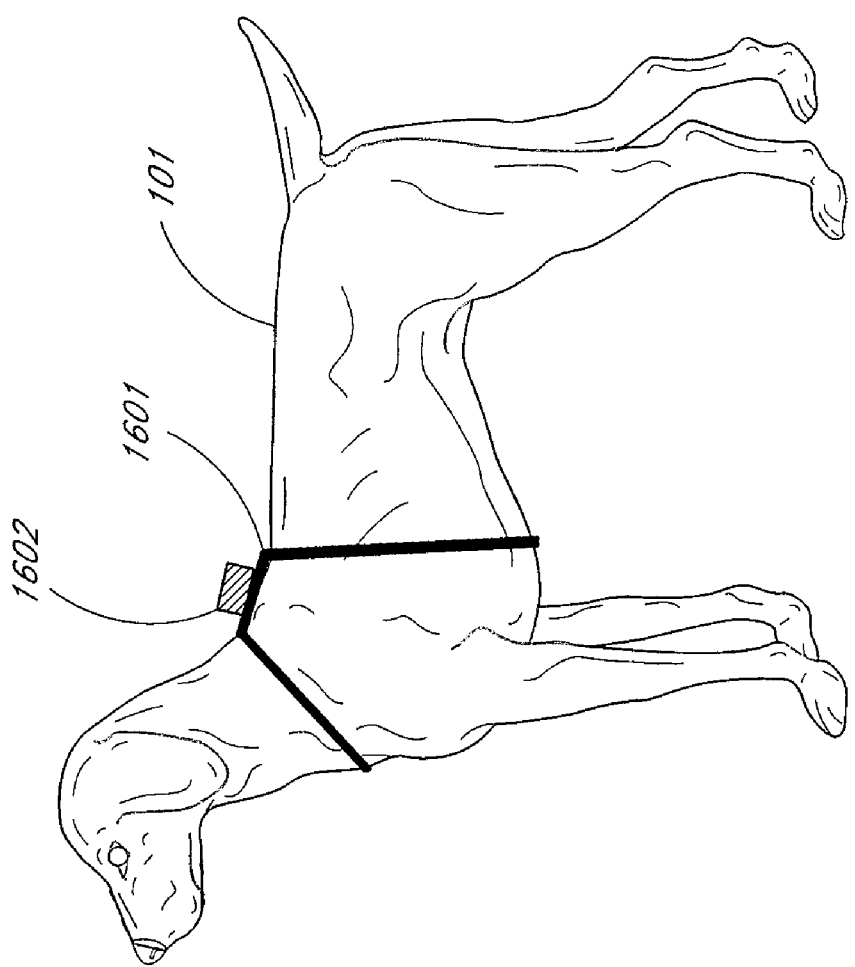
FIG. 16A shows the elements of the dog collar implemented using a harness instead of a collar with the camera located on the dog's back.

FIG. 16A shows the harness 1601 with an electronic module 1602 located on the dog's back. The electronic module 1602 includes one or more of the blocks shown for the animal system 102 in FIGS. 2, 3, and/or 15. When the camera 1501 is located in the module 1602 as shown in FIG. 16A, the camera 1501 can be configured to have a field of view to the left, to the right, up, and/or behind the dog.

Figure 16B:
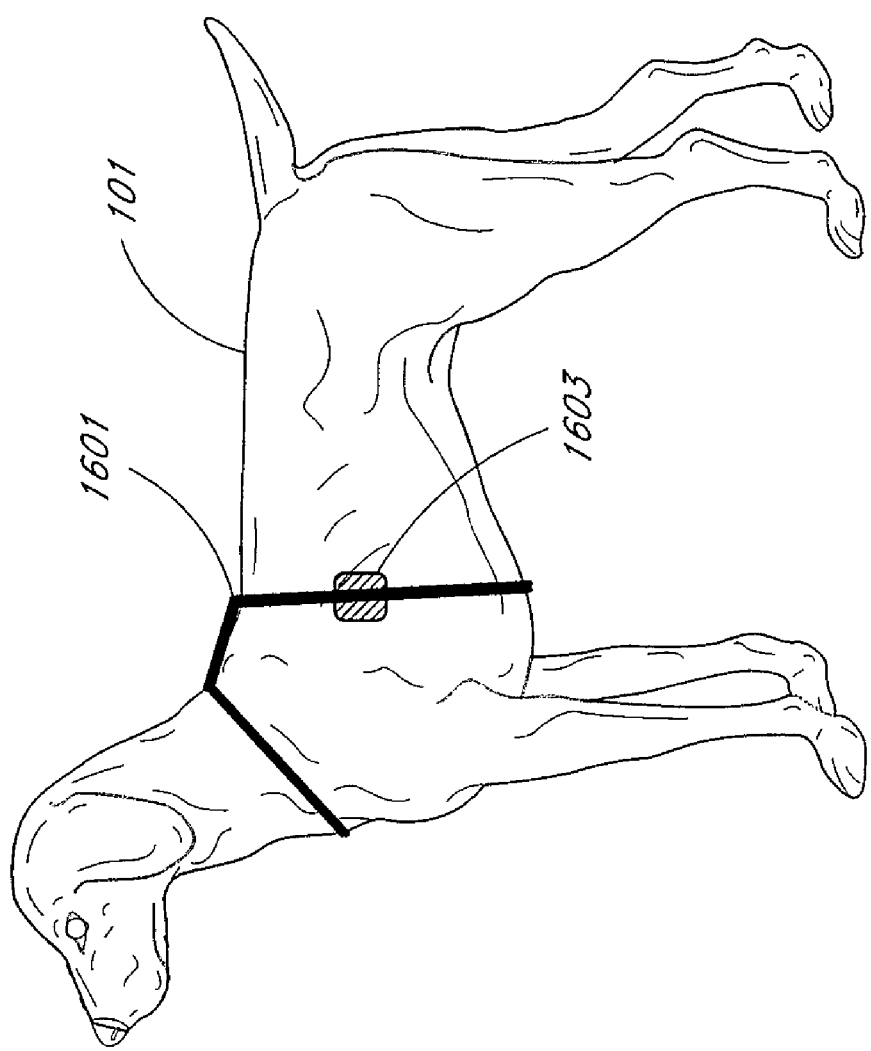
FIG. 16B shows the elements of the dog collar implemented using a harness instead of a collar with the camera located on the dog's flank area.

FIG. 16B shows the harness 1601 with an electronic module 1603 located on the dog's flank or side. The electronic module 1603 includes one or more of the blocks shown for the animal system 102 in FIGS. 2, 3, and/or 15. When the camera 1501 is located in the module 1603 as shown in FIG. 16B, the camera 1501 can be configured to have a field of view to the left (when located on the left side) or to the right (when located on the right side) to the front, up, down, and/or behind the dog.

Figure 16C:
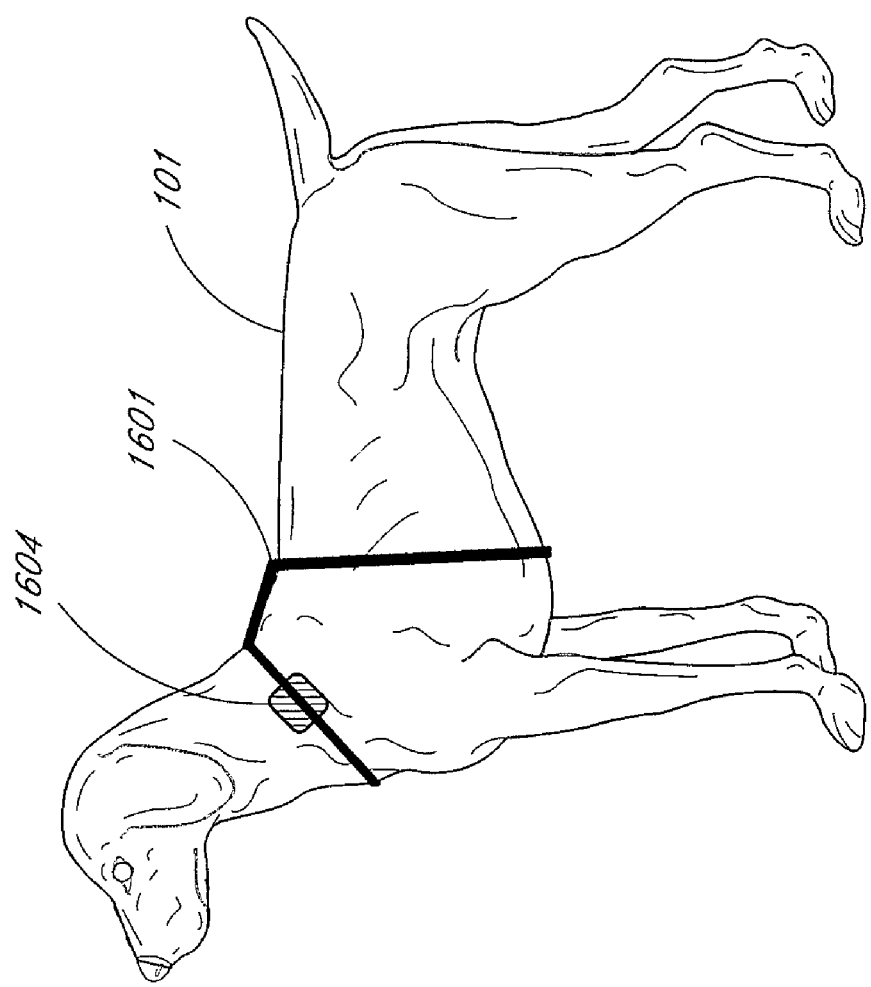
FIG. 16C shows the elements of the dog collar implemented using a harness instead of a collar with the camera located on the dog's neck or shoulder area.

FIG. 16C shows the harness 1601 with an electronic module 1604 located on the dog's neck or shoulder area. The electronic module 1604 includes one or more of the blocks shown for the animal system 102 in FIGS. 2, 3, and/or 15. When the camera 1501 is located in the module 1604 as shown in FIG. 16C, the camera 1501 can be configured to have a field of view to the left (when located on the left side) or to the right (when located on the right side) to the front, up, down, and/or behind the dog.

Figure 16D:
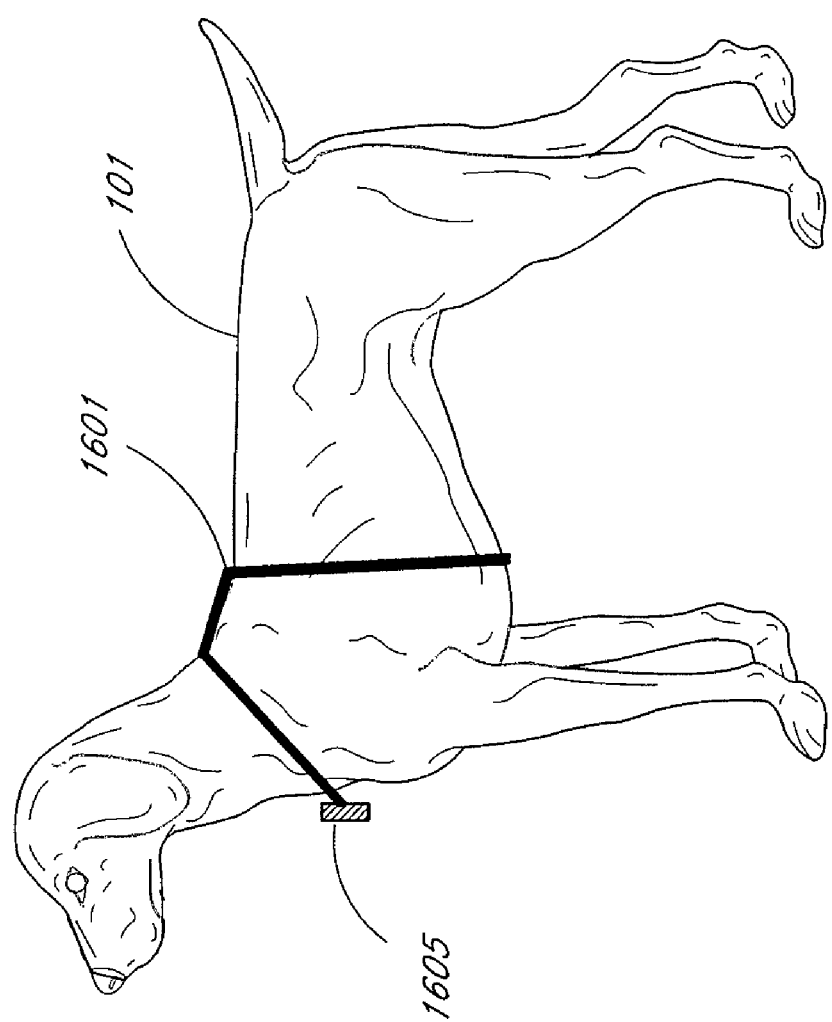
FIG. 16D shows the elements of the dog collar implemented using a harness instead of a collar with the camera located on the dog's chest.

FIG. 16D shows the harness 1601 with an electronic module 1605 located on the dog's chest. The electronic module 1605 includes one or more of the blocks shown for the animal system 102 in FIGS. 2, 3, and/or 15. When the camera 1501 is located in the module 1605 as shown in FIG. 16D, the camera 1501 can be configured to have a field of view to the left (when located on the left side) or to the right (when located on the right side) and/or to the front.

The configurations shown in FIGS. 16A-D are not mutually exclusive. One or more of the modules 1601-1605 can be provided to the same harness 1601.

Figure 17:
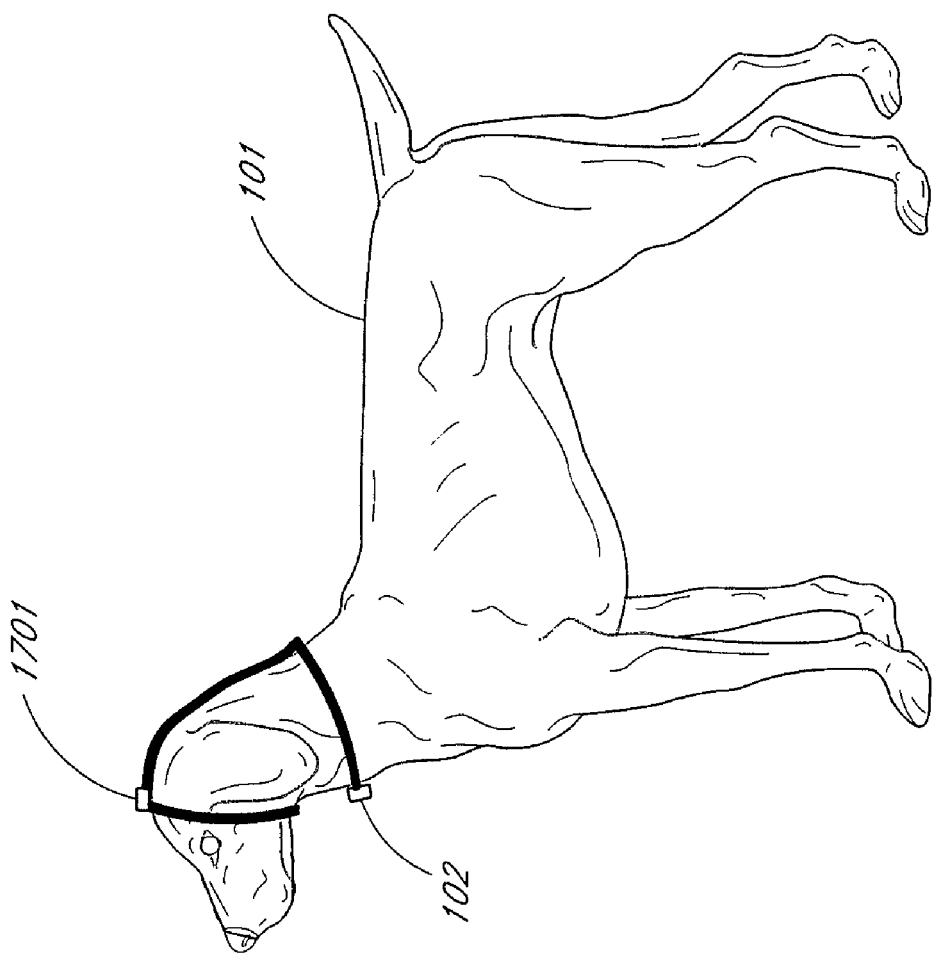
FIG. 17 shows the collar with a camera located on the dog's head.

FIG. 17 shows an electronic module 1701 located on the dog's head. The electronic module 1701 includes one or more of the blocks shown for the animal system 102 in FIGS. 2, 3, and/or 15. When the camera 1501 is located in the module 1701 as shown in FIG. 17, the camera 1501 can be configured to have a field of view to the left, to the right, to the front and/or to the rear.

Although various embodiments have been described above, other embodiments will be within the skill of one of ordinary skill in the art. Thus, although described in terms of a dog, such description was for sake of convenience and not by way of limitation. One of ordinary skill in the art will recognize that all or part of the system 100 can be applied to other animals, such as, for example, cats, livestock, zoo animals, farm animals, etc. Thus, the invention is limited only by the claims that follow.

What is claimed is:

1. A method of monitoring and controlling the behavior of an animal, comprising:

sending a command from a computer system to at least one device, said at least one device configured to provide positive or negative reinforcement stimulus to said animal based on said command;

receiving said command by said at least one device and providing said positive or negative reinforcement stimulus to said animal by said at least one device based on said command;

collecting data relating to the behavior of said animal by said at least one device and sending said data to said computer system, said computer system storing a history of said data;

performing an evaluation of the level of training of the animal by said computer system based at least in part on said data and said history of said data, characteristics specific to the breed of said animal, and of a temperament of said animal; and determining the appropriate subsequent command to send to said at least one device by said computer system based at least in part on said evaluation and adjusting a training program based on said evaluation.

2. A system for monitoring and controlling the behavior of an animal, comprising:

a computer system configured for two-way wireless communication; and at least one device configured to communicate with said computer system, wherein said computer system sends commands to at least one device, said at least one device having an output mechanism to provide positive or negative reinforcement stimulus based on said commands, said at least one device having an input mechanism to collect data relating to the behavior of said animal, wherein said at least one device sends said data to said computer system, wherein said computer system receives said data and stores a history of said data, wherein said computer performs an evaluation of the level of training of the animal based at least in part on said data and said history of said data, characteristics specific to the breed of said animal, and of a temperament of said animal, wherein said computer system determines the appropriate subsequent command to send to said at least one device based at least in part on said evaluation.

3. A method of remotely monitoring and controlling an animal, comprising:

sending a command to a computer system from a remote control, said computer system relaying said command to at least one device, said at least one device configured to provide positive or negative reinforcement stimulus to said animal based on said command;

receiving said command by said at least one device and providing said positive or negative reinforcement stimulus to said animal by said at least one device based on said command;

collecting data relating to the behavior of said animal by said at least one device and sending said data to said computer system, said computer system storing a history of said data;

performing an evaluation of the level of training of the animal by said computer system based at least in part on said data and said history of said data, characteristics specific to the breed of said animal, and of a temperament of said animal;

generating a report based on said evaluation; and sending said report to said remote control.

4. A system for remotely monitoring and controlling an animal, comprising:

a remote control configured for two-way wireless communication;

a computer system configured to communicate with said remote control, wherein said computer system receives commands from said remote control; and at least one device configured to communicate with said computer system, wherein said computer system relays commands from said remote control to said at least one device, said at least one device having an output mechanism to provide positive and negative reinforcement stimulus based on said commands, said at least one device having an input mechanism to collect data relating to the behavior of said animal, wherein said at least one device sends said data to said computer system, wherein said computer system receives said data and stores a history of said data, wherein said computer system performs an evaluation of the level of training of the animal based at least in part on said data and said history of said data, characteristics specific to the breed of said animal, and of a temperament of said animal, wherein said computer system generates a report based at least in part on said evaluation and sends said report to said remote control.

* * * * *